(12) United States Patent
McGowan et al.

(10) Patent No.: US 8,954,540 B2
(45) Date of Patent: *Feb. 10, 2015

(54) DYNAMIC AUDIO TRACK SELECTION FOR MEDIA STREAMING

(76) Inventors: Albert John McGowan, Phoenix, AZ (US); Richard I. Carls, Scottsdale, AZ (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/567,681

(22) Filed: Aug. 6, 2012

(65) Prior Publication Data

US 2012/0303766 A1 Nov. 29, 2012

Related U.S. Application Data

(63) Continuation-in-part of application No. 13/429,656, filed on Mar. 26, 2012, now Pat. No. 8,327,013, which is a continuation of application No. 12/976,883, filed on Dec. 22, 2010, now Pat. No. 8,145,782.

(30) Foreign Application Priority Data

Jun. 30, 2010 (AU) ............................... 2010202741

(51) Int. Cl.
*G06F 15/16* (2006.01)
*H04N 21/2183* (2011.01)
*H04N 21/231* (2011.01)
*H04N 21/239* (2011.01)
*H04N 21/25* (2011.01)
(Continued)

(52) U.S. Cl.
CPC ..... *H04N 21/2183* (2013.01); *H04N 21/23106* (2013.01); *H04N 21/2393* (2013.01); *H04N 21/252* (2013.01); *H04N 21/6125* (2013.01); *H04N 21/812* (2013.01); *H04N 21/8455* (2013.01); *H04N 21/8456* (2013.01); *H04N 21/26258* (2013.01)
USPC ...... 709/219; 709/220; 709/218; 375/240.26; 725/32

(58) Field of Classification Search
USPC ............. 709/213, 220, 218, 219; 375/240.26; 725/32
See application file for complete search history.

(56) References Cited

U.S. PATENT DOCUMENTS

| 5,612,742 A | 3/1997 | Krause et al. |
| 6,505,169 B1 | 1/2003 | Bhagavath et al. |

(Continued)

FOREIGN PATENT DOCUMENTS

| AU | 2010/202741 B1 | 12/2010 |
| CN | 101282478 A | 10/2008 |

(Continued)

OTHER PUBLICATIONS

U.S. Appl. No. 12/976,883, Notice of Allowance mailed on Feb. 10, 2012, 7 pages.

(Continued)

*Primary Examiner* — Tammy Nguyen
(74) *Attorney, Agent, or Firm* — Kilpatrick Townsend & Stockton LLP

(57) ABSTRACT

Systems and methods for providing index files for dynamic audio track selection for media streaming can include receiving requests for media file segments (e.g., "chunks") with a certain audio track and responding to the requests by dynamically generating the corresponding media file segment with the requested audio track. The generated media file segment can then be provided to the requesting entity.

20 Claims, 13 Drawing Sheets

(51) Int. Cl.
*H04N 21/61* (2011.01)
*H04N 21/81* (2011.01)
*H04N 21/845* (2011.01)
*H04N 21/262* (2011.01)

(56) References Cited

U.S. PATENT DOCUMENTS

| | | | |
|---|---|---|---|
| 6,678,332 B1 | 1/2004 | Gardere et al. | |
| 6,792,047 B1 | 9/2004 | Bixby et al. | |
| 6,912,315 B1 | 6/2005 | Wong et al. | |
| 7,096,481 B1 | 8/2006 | Forecast et al. | |
| 7,116,894 B1 | 10/2006 | Chatterton | |
| 7,788,581 B1 | 8/2010 | Bauermeister | |
| 7,827,298 B2 | 11/2010 | Black et al. | |
| 7,877,511 B1 | 1/2011 | Berger et al. | |
| 7,925,549 B2 | 4/2011 | Looney et al. | |
| 7,925,849 B2 | 4/2011 | Izumi | |
| 7,958,007 B2 | 6/2011 | Urbanski et al. | |
| 7,992,165 B1* | 8/2011 | Ludewig et al. | 725/32 |
| 8,027,787 B2* | 9/2011 | Odinak et al. | 701/424 |
| 8,027,876 B2 | 9/2011 | Taylor | |
| 8,099,473 B2 | 1/2012 | Biderman et al. | |
| 8,145,782 B2 | 3/2012 | McGowan et al. | |
| 8,165,343 B1 | 4/2012 | McGowan | |
| 8,218,651 B1* | 7/2012 | Eshet et al. | 375/240.26 |
| 8,239,546 B1 | 8/2012 | McGowan | |
| 8,301,733 B2* | 10/2012 | McGowan | 709/219 |
| 2001/0029525 A1* | 10/2001 | Lahr | 709/218 |
| 2002/0046404 A1 | 4/2002 | Mizutani | |
| 2002/0073084 A1 | 6/2002 | Kauffman et al. | |
| 2002/0104096 A1 | 8/2002 | Cramer et al. | |
| 2002/0122430 A1 | 9/2002 | Haberman et al. | |
| 2002/0144262 A1 | 10/2002 | Plotnik et al. | |
| 2002/0150239 A1 | 10/2002 | Carny et al. | |
| 2003/0004804 A1* | 1/2003 | Landsman et al. | 705/14 |
| 2003/0229900 A1 | 12/2003 | Reisman | |
| 2004/0022391 A1 | 2/2004 | O'Brien | |
| 2004/0268384 A1 | 12/2004 | Stone | |
| 2005/0076368 A1 | 4/2005 | Lee | |
| 2005/0163229 A1 | 7/2005 | Okada et al. | |
| 2005/0193205 A1 | 9/2005 | Jacobs et al. | |
| 2005/0207569 A1 | 9/2005 | Zhang et al. | |
| 2006/0015637 A1 | 1/2006 | Chung | |
| 2006/0114985 A1 | 6/2006 | Linzer | |
| 2006/0122882 A1 | 6/2006 | Brown et al. | |
| 2006/0129907 A1 | 6/2006 | Volk et al. | |
| 2006/0288112 A1 | 12/2006 | Soelberg et al. | |
| 2007/0078712 A1 | 4/2007 | Ott, IV et al. | |
| 2007/0162571 A1 | 7/2007 | Gupta et al. | |
| 2007/0168542 A1 | 7/2007 | Gupta et al. | |
| 2007/0198416 A1 | 8/2007 | Ye | |
| 2007/0233891 A1 | 10/2007 | Luby et al. | |
| 2008/0005349 A1 | 1/2008 | Li et al. | |
| 2008/0059310 A1 | 3/2008 | Lettow et al. | |
| 2008/0141027 A1 | 6/2008 | Kim et al. | |
| 2008/0207182 A1 | 8/2008 | Maharajh et al. | |
| 2008/0215620 A1 | 9/2008 | Folger et al. | |
| 2009/0003432 A1 | 1/2009 | Liu et al. | |
| 2009/0022172 A1 | 1/2009 | Haberman et al. | |
| 2009/0031424 A1 | 1/2009 | Ganesan et al. | |
| 2009/0063280 A1 | 3/2009 | Wurster et al. | |
| 2009/0150941 A1 | 6/2009 | Riedl et al. | |
| 2009/0172197 A1 | 7/2009 | Kalaboukis et al. | |
| 2009/0217316 A1 | 8/2009 | Gupta | |
| 2009/0257435 A1 | 10/2009 | Karlsson et al. | |
| 2009/0287841 A1 | 11/2009 | Chapweske et al. | |
| 2009/0300145 A1 | 12/2009 | Musayev et al. | |
| 2009/0327896 A1 | 12/2009 | Pall et al. | |
| 2010/0057926 A1 | 3/2010 | Cao et al. | |
| 2010/0095121 A1 | 4/2010 | Shetty et al. | |
| 2010/0100742 A1 | 4/2010 | Courington et al. | |
| 2010/0107200 A1 | 4/2010 | Drang et al. | |
| 2010/0118973 A1 | 5/2010 | Rodriguez et al. | |
| 2010/0129057 A1 | 5/2010 | Kulkarni | |
| 2010/0138892 A1 | 6/2010 | Meuninck et al. | |
| 2010/0161425 A1 | 6/2010 | Sideman | |
| 2010/0189131 A1 | 7/2010 | Branam et al. | |
| 2010/0205049 A1 | 8/2010 | Long et al. | |
| 2011/0029999 A1 | 2/2011 | Foti | |
| 2011/0071911 A1 | 3/2011 | Tung et al. | |
| 2011/0161181 A1 | 6/2011 | Esteve Asensio et al. | |
| 2011/0238507 A1 | 9/2011 | Ben-Rubi | |
| 2011/0246603 A1 | 10/2011 | Lee | |
| 2011/0246659 A1 | 10/2011 | Bouazizi | |
| 2011/0264506 A1 | 10/2011 | Grant et al. | |
| 2011/0287748 A1 | 11/2011 | Angel et al. | |
| 2012/0005312 A1 | 1/2012 | McGowan et al. | |
| 2012/0005313 A1 | 1/2012 | McGowan et al. | |
| 2012/0023253 A1 | 1/2012 | Rhyu et al. | |
| 2012/0047542 A1 | 2/2012 | Lewis et al. | |
| 2012/0134355 A1 | 5/2012 | Vendrow et al. | |
| 2012/0167132 A1 | 6/2012 | Mathews et al. | |
| 2012/0179788 A1 | 7/2012 | McGowan | |
| 2012/0185608 A1 | 7/2012 | McGowan et al. | |
| 2012/0197419 A1 | 8/2012 | Dhruv et al. | |
| 2012/0198492 A1 | 8/2012 | Dhruv et al. | |

FOREIGN PATENT DOCUMENTS

| | | | |
|---|---|---|---|
| GB | 2462732 A | 2/2010 | |
| WO | 2010/025686 A1 | 3/2010 | |
| WO | 2011/039617 A1 | 4/2011 | |

OTHER PUBLICATIONS

U.S. Appl. No. 12/976,883, Final Office Action mailed on Dec. 20, 2011, 11 pages.
U.S. Appl. No. 12/976,883, Non-Final Office Action mailed on Jul. 7, 2011, 11 pages.
U.S. Appl. No. 13/339,680, Advisory Action mailed on Sep. 6, 2013, 4 pages.
U.S. Appl. No. 13/339,680, Advisory Action mailed on Aug. 6, 2013, 3 pages.
U.S. Appl. No. 13/339,680, Final Office Action mailed on May 30, 2013, 12 pages.
U.S. Appl. No. 13/339,680, Non-Final Office Action mailed on Jul. 25, 2012, 10 pages.
U.S. Appl. No. 13/339,680, Non-Final Office Action mailed on Mar. 7, 2012, 14 pages.
U.S. Appl. No. 13/339,668, Final Office Action mailed on Feb. 1, 2013, 18 pages.
U.S. Appl. No. 13/339,668, Non-Final Office Action mailed on Jul. 27, 2012, 12 pages.
U.S. Appl. No. 13/339,668, Non-Final Office Action mailed on Mar. 9, 2012, 15 pages.
U.S. Appl. No. 13/624,029, Notice of Allowance mailed on Sep. 27, 2013, 6 pages.
U.S. Appl. No. 13/624,029, Notice of Allowance mailed on May 30, 2013, 6 pages.
U.S. Appl. No. 13/624,029, Non-Final Office Action mailed on Feb. 5, 2013, 5 pages.
U.S. Appl. No. 13/429,656, Notice of Allowance mailed Aug. 7, 2012, 7 pages.
U.S. Appl. No. 13/429,656, Non-Final Office Action mailed Jul. 2, 2012, 6 pages.
Australian Patent Office, Examiner's First Report on Patent Application No. 2010202740 for Unicorn Media, Inc. (Atty. Ref. No. 028406-001100AU), dated Aug. 10, 2010, 3 pages.
Australian Patent Office, Examiner's First Report on Patent Application No. 2010202741 for Unicorn Media, Inc. (Atty. Ref. No. 028406-001000AU), dated Aug. 9, 2010, 4 pages.
Ben Atallah, S., et al., "Dynamic Configuration of Multimedia Applications," IFIP International Federation for Information Processing, 2003, 18 pages.
International Search Report and Written Opinion of PCT/US2012/071629 mailed on Apr. 5, 2013, 92 pages.
International Search Report and Written Opinion of PCT/US2012/071669 mailed on Apr. 5, 2013, 74 pages.
International Search Report and Written Opinion of PCT/US2013/025180 mailed on Jun. 5, 2013, 105 pages.

(56) References Cited

OTHER PUBLICATIONS

International Search Report and Written Opinion of PCT/US2013/023181 mailed on May 8, 2013, 91 pages.

Prangl, M. et al. "Towards QoS Improvements of TCP-Based Media Delivery," Networking and Services, 2008, ICNS 2008: Fourth International Conference on IEEE, Piscataway, NJ, USA, Mar. 16, 2008, 6 pages.

Gabin, F. et al. "3GPP Mobile Multimedia Streaming Standards [Standards in a Nutshell]", IEEE Signal Processing Magazine, IEEE Service Center, Piscataway, NJ, US, vol. 27, No. 6, Nov. 1, 2010, pp. 134-138, XP011317684, ISSN: 1053-5888, p. 135-p. 137.

* cited by examiner

DYNAMIC AUDIO TRACK SELECTION FOR MEDIA STREAMING

CROSS-REFERENCE TO RELATED APPLICATION

This application is a continuation-in-part of U.S. patent application Ser. No. 13/429,656, filed Mar. 26, 2012, entitled "DYNAMIC INDEXING FILE CREATION FOR MEDIA STREAMING" which is a continuation application of U.S. patent application Ser. No. 12/976,883, filed Dec. 22, 2010, entitled "DYNAMIC CHUNKING FOR MEDIA STREAMING," which issued as U.S. Pat. No. 8,145,782, on Mar. 27, 2012, which claims priority to Australian Patent Application Serial No. 2010202741, filed Jun. 30, 2010, entitled "DYNAMIC CHUNKING FOR MEDIA STREAMING," all of which is incorporated herein by reference for all purposes.

BACKGROUND OF THE INVENTION

This disclosure relates in general to cloud-based computer processing and, but not by way of limitation, to indexing and chunking media files for use in media streaming.

The delivery of media over networks such as the Internet can be accomplished in many ways, including progressive downloading or streaming. Streaming is often preferred to progressive downloading because it offers additional features such as content protection and the ability to seek to undownloaded parts of a media file. The process of preparing a media file for streaming typically involves "chunking" the file, or dividing files up into smaller segments for delivery. Information including where chunks may be accessed can be stored in an index file. This index file can be delivered to a client, such as a media player application, for use in streaming.

The processes of chunking and indexing files for streaming present challenges to a content delivery network or content provider desiring to host media files for streaming. For example, a significant amount of preprocessing is required to prepare media for streaming. Media content may be encoded into several different files to accommodate several different sub-streams. Each of these files typically are chunked, stored, and indexed before the media content is available for streaming. This preprocessing leaves little flexibility for dynamically selecting an audio track during streaming and can require a large amount of storage space to store the preprocessed chunks of media.

BRIEF SUMMARY OF THE INVENTION

Systems and methods for providing index files for dynamic audio track selection for media streaming are disclosed. These systems and methods provide for receiving requests for media file segments with a certain audio track and responding to the requests by generating the corresponding media file segment with the requested audio track. The generated media file segment can then be provided to the requesting entity.

An embodiment of a server for communicating a media file via a network, according to the description herein, includes an interface for communicating with the network, a memory configured to store the media file, and a processor communicatively coupled with the memory and the interface. The processor can be configured to cause the server to receive, with the interface, a request for a first segment of the media file. The first segment can include one of a plurality of separately-addressable segments of the media file. The processor also can be configured to cause the server to determine, based on the request for the first segment of the media file, a starting point and an ending point of the requested first segment of the media file, and retrieve a first portion of the media file from the memory. The first portion of the media file can include at least the requested first segment of the media file, and the first portion of the media file can include a video component and at least one audio track. Additionally, the processor can be configured to cause the server to generate the requested first segment of the media file. The requested first segment of the media file can have a single audio track, and the requested first segment of the media file can be generated, at least in part, from the first portion of the media file without transcoding. Finally, the processor can be configured to cause the server to provide, with the interface, the requested first segment of the media file. Generating the requested first segment of the media file can occur during playback of the media file.

The embodiment of the server for communicating the media file via the network can include one or more of the following features. The processor can be configured to cause the server to receive, with the interface, a request for a second segment of the media file, the second segment including one of the plurality of separately-addressable segments of the media file; determine, based on the request for the second segment of the media file, a starting point and an ending point of the requested second segment of the media file; retrieve a second portion of the media file from the memory, where the second portion of the media file includes at least the requested second segment of the media file; generate the requested second segment of the media file, where the requested second segment of the media file has a single audio track different than the single audio track of the requested first segment of the media file; and provide, with the interface, the requested second segment of the media file. The first portion of the media file and the second portion of the media file can be the same. The first portion of the media file and the second portion of the media file can include the entire media file. The video component and the at least one audio track can be stored in separate files. The video component and the at least one audio track can be stored in a single file. The processor can be configured to cause the server to generate a file including the media file with the single audio track, and store the generated file in the memory, where first portion of the media file includes the generated file. Generating the file can include combining audio from a first file and video from a second file. If there are two or more audio tracks, the processor can be configured to cause the server to select the single audio track from the two or more audio tracks based on information received in the request for the first segment of the media file.

An embodiment of a method for streaming a media file via a data network, according to the description herein, includes receiving a request for a first segment of the media file, where the first segment includes one of a plurality of separately-addressable segments of the media file. The method further includes determining, based on the request for the first segment of the media file, a starting point and an ending point of the requested first segment of the media file, and retrieving a first portion of the media file, where the first portion of the media file includes at least the requested first segment of the media file, and the first portion of the media file includes a video component and at least one audio track. The method also includes generating, with a processing unit, the requested first segment of the media file, where the requested first segment of the media file has a single audio track, and the requested first segment of the media file is generated, at least in part, from the first portion of the media file without transcoding. Finally, the method includes providing the requested first segment of the media file. Generating the requested first segment of the media file can occur during playback of the media file.

The embodiment of the method for streaming the media file via the data network can include one or more of the following features. Receiving a request for a second segment of the media file, the second segment including one of the plurality of separately-addressable segments of the media file; determining, based on the request for the second segment of the media file, a starting point and an ending point of the requested second segment of the media file; retrieving a second portion of the media file, where the second portion of the media file includes at least the requested second segment of the media file; generating, with the processing unit, the requested second segment of the media file, where the requested second segment of the media file has a single audio track different than single the audio track of the requested first segment of the media file; and providing the requested second segment of the media file. The video component and the at least one audio track can be stored in separate files. Generating a file including the media file with the single audio track, and storing the generated file, where there first portion of the media file includes the generated file. Generating the file can include combining audio from a first file and video from a second file. If there are a plurality of audio tracks, the method can further include selecting the single audio track from the plurality of audio tracks based on information received in the request for the first segment of the media file.

An embodiment of a computer-readable storage medium having instructions embedded thereon for streaming a media file via a data network, according to the description herein, can include instructions with computer code for receiving a request for a first segment of the media file. The first segment can include one of a plurality of separately-addressable segments of the media file. The instructions can also include computer code for determining, based on the request for the first segment of the media file, a starting point and an ending point of the requested first segment of the media file, and retrieving a first portion of the media file, where the first portion of the media file includes at least the requested first segment of the media file, and the first portion of the media file includes a video component and at least one audio track. The instructions further can include computer code for generating the requested first segment of the media file, where the requested first segment of the media file has a single audio track, and the requested first segment of the media file is generated, at least in part, from the first portion of the media file without transcoding. Finally, instructions can include computer code for providing the requested first segment of the media file. Generating the requested first segment of the media file can occur during playback of the media file.

The embodiment of the computer-readable storage medium can also include one or more of the following features. The instructions can include computer code for receiving a request for a second segment of the media file, where the second segment includes one of the plurality of separately-addressable segments of the media file; determining, based on the request for the second segment of the media file, a starting point and an ending point of the requested second segment of the media file; retrieving a second portion of the media file, where the second portion of the media file includes at least the requested second segment of the media file; generating the requested second segment of the media file, where the requested second segment of the media file has a single audio track different than the single audio track of the requested first segment of the media file; and providing the requested second segment of the media file. The video component and the at least one audio track can be stored in separate files. The instructions can include computer code for generating a file including the media file with the single audio track, and storing the generated file, where there first portion of the media file can include the generated file. Generating the file can include combining audio from a first file and video from a second file.

BRIEF DESCRIPTION OF THE DRAWINGS

The present disclosure is described in conjunction with the appended figures.

Figure 1:
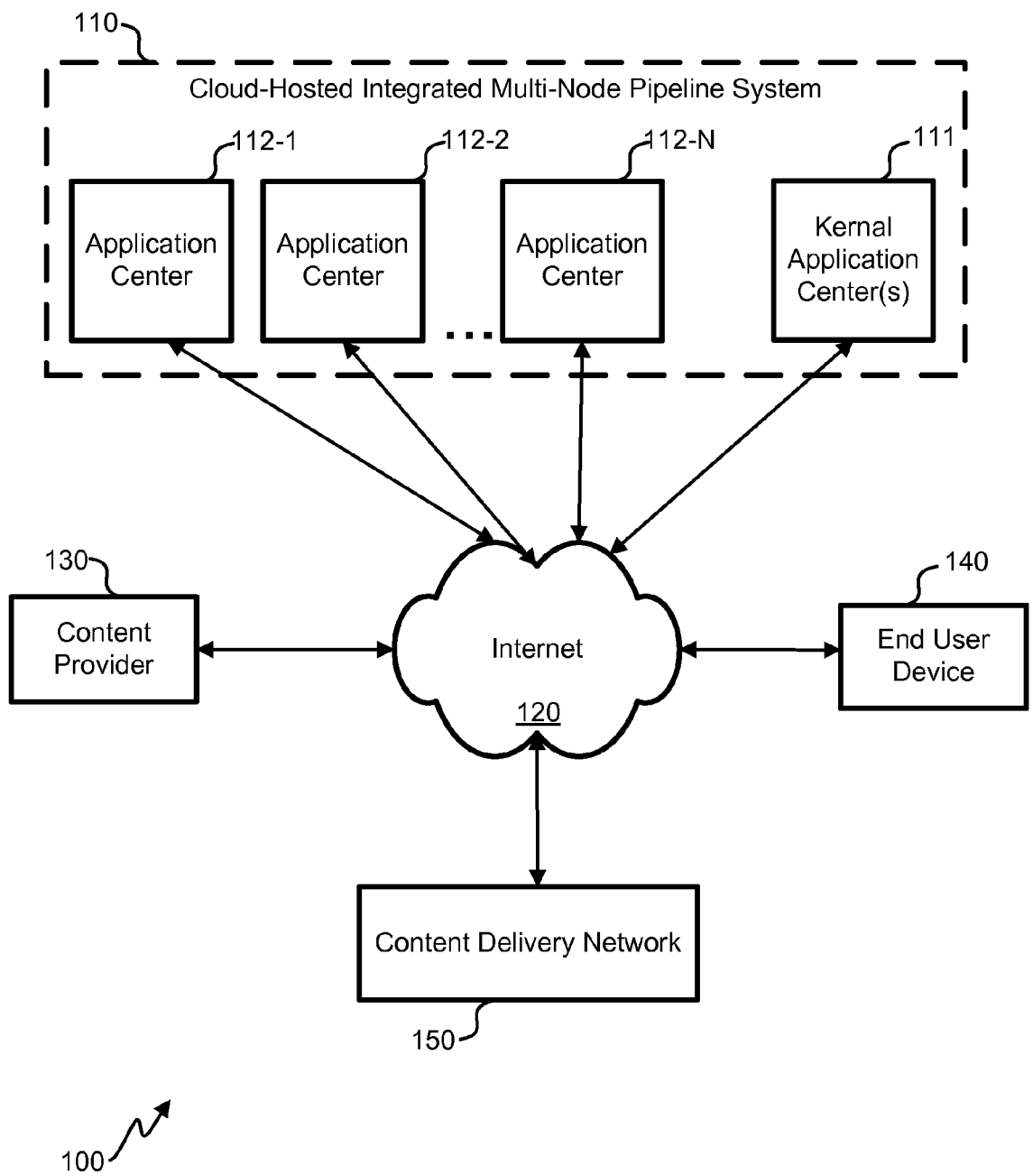
FIG. 1 illustrates a block diagram of a media servicing system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

The increased availability of media content over data communications networks such as the Internet has mirrored the increased bandwidth for these networks. Because media has recently taken a more prominent role in data communications, the distribution of media and the data associated with such distribution has become increasingly important, particularly to media content providers. Media streaming has become a widely-used method of media distribution, but the preprocessing associated with streaming can be burdensome. Certain protocols, including forms of Hypertext Transfer Protocol (HTTP) streaming, require chunking and storing media assets, and generating a corresponding index files. These requirements can deprive a content provider of the ability to dynamically insert additional media such as advertisements into a media stream, and can consume a large amount of storage space to store chunks of media for a media asset, including chunks for any alternative sub-streams (e.g., streams with alternative bitrates, captions, alternative languages, etc.). Certain systems and methods can be utilized, however, to introduce the desired functionality back into the system.

A traditional approach to preprocessing media for streaming involves chunking and storing media assets, then creating corresponding index files to indicate where chunks may be located to download for streaming. Streaming protocols often provide for frequently updating an index file for instances where the corresponding media is frequently updated, such as during live streaming. Thus, an index file does not need to contain all chunks for a requested media asset. In addition, because media files are frequently stored in a format that requires little additional processing to chunk, the chunks can be created in real time, during the streaming of a media file. The systems and methods disclosed herein take advantage of these features to enable dynamic index file creation and dynamic media file chunking.

For instance, rather than preprocess media assets for streaming by chunking and indexing all files with relevant sub-streams prior to streaming the media, a server can dynamically create and update an index file during streaming. The dynamically-created index file can contain information regarding a next chunk of media in the various available sub-streams. The next chunk of media may not be cached at a location specified in the index file, in which case a chunk may be dynamically created by pulling all or part of the media file of interest from a media file origin, chunking it, and making it available for download. The chunk also may be cached, thereby eliminating the need to create the chunk again if it is requested at some later time.

Because the chunks are created during streaming, a content provider and/or media distributer can have more information and control during the streaming process. Rather than generate single index file for a given media asset, an instance of the index file generator may be created at the beginning of the media streaming to provide individualized media content to a particular end user and unique information regarding the streaming session to a content provider. The file index generator can vary the length of each chunk by, for example, indicating starting and ending points in the index file. Thus, the file index generator may determine a uniform chunk length for a media asset, varying the length of the chunks for different media assets, or the file index generator may adjust the length of the chunks within a single media asset. The index file generator can further insert additional media, such as an advertisement, at any time during the streaming by specifying the location of the additional media in the index file. The determination to insert advertisements can be based on any information, including data collected during the streaming session.

As the index file generator receives requests for and generates index files, it can further gather data regarding the streaming session for reporting to a content provider. Content providers often rely on beaconing data collected from media player applications to determine when an end user stops, plays, pauses, skips, etc., the streaming media content. Such information can be vital in determining the value of the media.

Because not all media player applications provide this beaconing data, the data gathered by the index file generator can serve as a substitute for or complement to the beaconing data. For example, if a request is made for a chunk that does not immediately follow a previously-requested chunk, a skip was made. If the amount of time elapsed between a previous request and a subsequent request exceeds the time for playback of the previously-requested chunk, a pause was made. If a request is not received within a certain time since a prior request, it can be determined that a stop was made.

As illustrated above, the state of a client may be determined from a variety of factors. This can include when the request for the index file is received, when the index file is provided, a length of time to play back the segment of media for streaming, and/or the starting and/or ending point of the segment of media for streaming. The determined state of a client may also be based on whether the request for the index file has been received within a certain amount of time since receipt of a previous request for an index file, whether the segment of media for streaming includes media other than the media file, and more. The state of a client and/or the data from which it was determined, may be used to create reporting data to serve as a substitute or complement to beaconing data from a client media player application. Because the index file generator can determine the length of the chunks, it therefore can determine the frequency of subsequent index file requests and the resolution of the reporting data based on the requests. The index file generator may log the reporting data and/or transmit the reporting data over a network during streaming.

The determined state of a client may be used by the index file generator and/or other services for various purposes. For example, it may be used in behavioral advertisement targeting and enforcement of session advertisement behavior, adjusting advertisement content and playback based on the behavior of a user as determined by the stated of a client. The state of a client further may be used to support resume features on a per client basis, allowing a user to continue playback of a media asset from a point at which the user had previously stopped playback. The state of a client also may be used to support individual encryption keys in an encryption scheme and allow the index file generator to return secure URLs (e.g., time expiring or Internet Protocol (IP) allowed) for chunks to support functions such as payment services.

Additionally or alternatively, the tasks of generating the index file and providing a location a requested chunk can be split up, thereby enabling the system to determine which chunks are actually requested. For example, a system may be configured to dynamically create an index file having links to one or more redirectors on the system. These redirectors can be configured to issue the location of the chunk, which can be created dynamically. The redirectors can further determine which chunk is actually requested, thereby enabling, among other things, calculation of Quality of Service (QOS) metrics, an increase the accuracy of reporting data, a decrease the frequency of index file generation if efficient to do so, and the ability to more easily handle keys of an encryption scheme.

While the above embodiments may be implemented in a variety of different systems, some particular embodiments may be implemented as part of a media service system. FIG. 1 is a block diagram illustrating a media servicing system 100, according to some embodiments of the present invention. The system may deliver media content to the end user device 140 through a network such as the Internet 120. The end user device 140 can be one of any number of devices configured to receive media over the Internet 120, such as a mobile phone, tablet computer, personal computer, portable media device, etc. A media asset provided by a content provider 130 can be processed and indexed by cloud-hosted integrated multi-node pipelining system (CHIMPS) 110, and further stored on content delivery network (CDN) 150. Additionally or alternatively, the CHIMPS 110 may also be adapted to store the media asset.

The media servicing system further enables a content provider 130 or other entity to gather information regarding user behavior during media playback. For example, a content provider 130 can be provided with data indicating that end users tend to stop watching a video at a certain point in playback, or that users tended to follow links associated with certain advertisements displayed during playback. With this data, a content provider 130 can adjust factors such as media content, advertisement placement and content, etc., to increase revenue associated with the media content and provide the end user device 140 with a more desirable playback experience.

End user device 140 can request a media asset to stream with a client program executed by the end user device 140. The client program can be, for example, a media player, browser, or other application adapted to request and/or play media assets. In response to a request for a media asset, the CHIMPS 110 can utilize any number of application centers 112 and/or kernel application center(s) 111 to provide the client program with a data object concerning the requested media asset. The data object can include information about the media asset, including where the media asset can be located, such as within the CDN 150 or within the CHIMPS 150 itself Location information may be provided by Universal Resource Indicator (URI), a Universal Resource Locator (URL) or other indicator. During playback of the media asset, the CHIMPS 150 can collect data regarding the playback through beaconing provided by a client program executed by the end user device 140 and/or indexing service from within the CHIMPS and/or CDN. The CHIMPS 150 can subsequently provide the data and/or any analytics information derived from the data to the content provider 130.

Figure 2A:
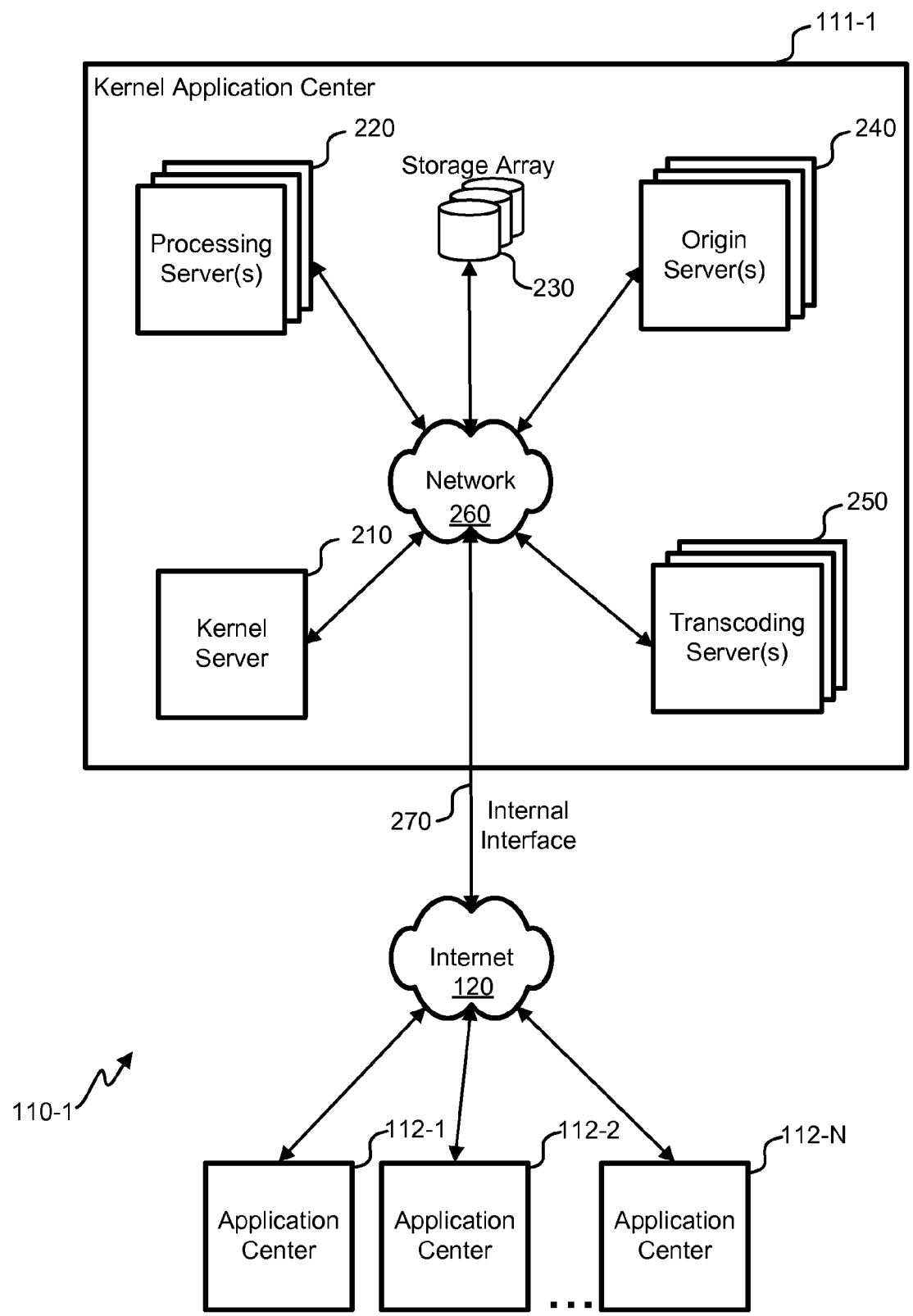
FIG. 2A illustrates a block diagram of an embodiment of a kernel application center connected with application centers.

FIG. 2A is a block diagram illustrating an embodiment of a kernel application 111-1 center connected with application centers from within the CHIMPS 110-1. The kernel application center 111-1 and application centers 112 can be geographically distant and can be connected via the Internet 120, wide area network (WAN), and/or other data communication network. Because application centers can be geographically separated, DNS services (not shown) can be used to allow an end user device 140 to connect to the nearest available application center 112. The kernel application center 111-1 can connect with application centers 112 within the CHIMPS 110-1 through an internal interface 270, thereby enabling the application centers 112 access to the various components within the kernel application center 111-1.

Components within the kernel application center 111-1 can communicate through network 260 such as a local area network (LAN) and can include one or more origin servers 240 and a storage array 230 with which data objects and/or media assets may be stored and distributed. The storage array 230 may also be utilized by services running on processing server(s) 220 and/or transcoding server(s) 250 that may require temporary or long-term storage. Kernel server 210 can utilize processing server(s) 220, transcoding server(s) 250 to provide various functional capabilities to the CHIMPS 110.

For example, as described in more detail below, the CHIMPS 110-1 can provide transcoding service for media assets provided by a content provider 130 for syndication. Such a service can allow a content provider 130 to upload a media asset to an application center 112, after which the application center 112 would notify the kernel server 210 that the media asset has been uploaded. The kernel server can then notify services running on the processing server(s) 220 of the upload. These services can utilize transcoding server(s) to transcode the media asset, which can then be moved to a CDN and/or stored locally by storage array 230 and origin server(s) 240. Services running on the processing server(s) 220 can also update the associated data object stored by the storage array 230 and origin server(s) 240.

Figure 2B:
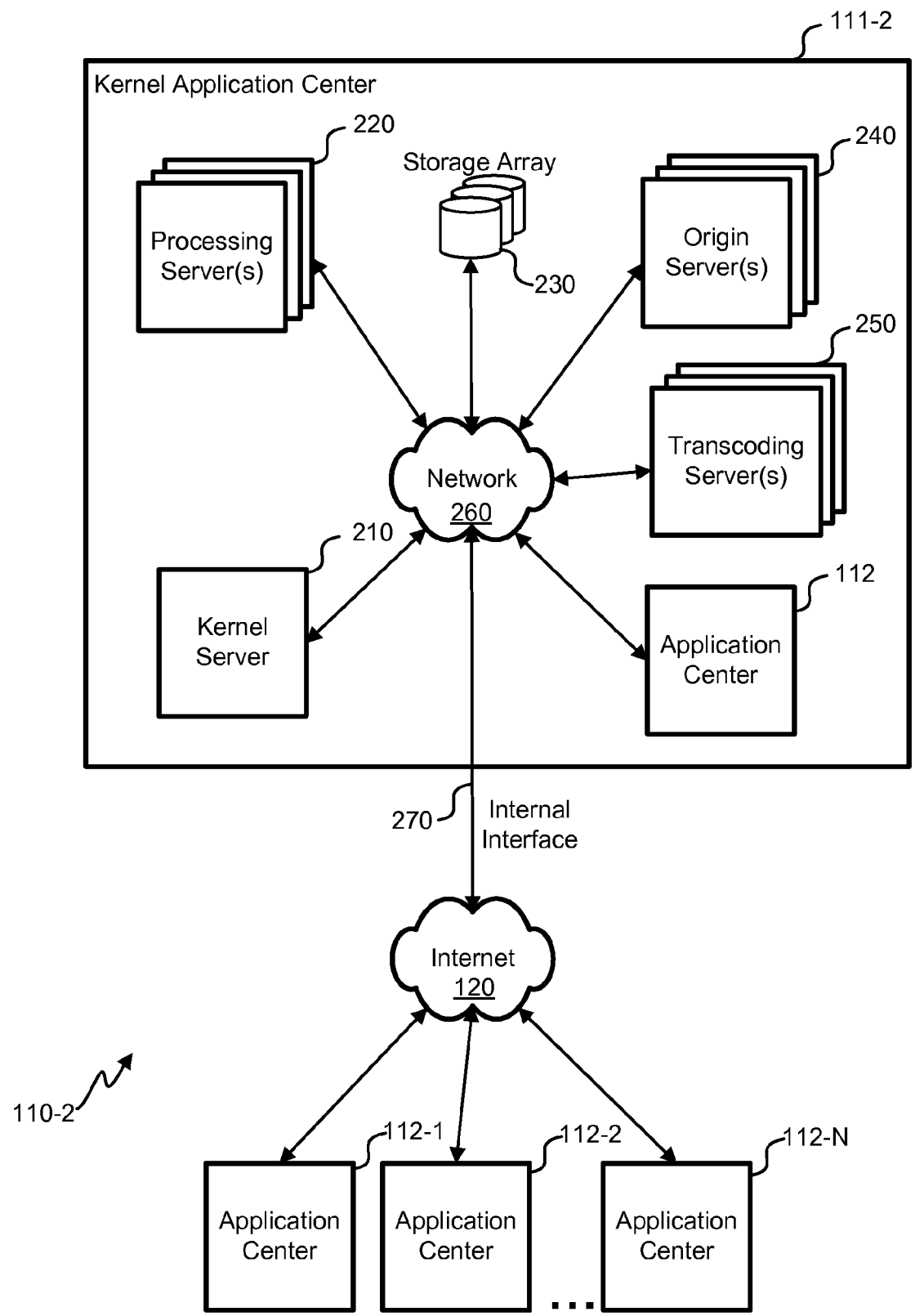
FIG. 2B illustrates a block diagram of an alternative embodiment of a kernel application center.

FIG. 2B is a block diagram illustrating an alternative embodiment of a kernel application center 111-2. In addition to the components of the embodiment of FIG. 2A, this embodiment incorporates an application center 112 within the kernel application center 111-2. The application center 112 incorporated within kernel application center 111-2 may be located at or near the other components of the kernel application center 111-2, and can be communicatively connected to the other components via network 260. The incorporated application center 112 can therefore have faster access to kernel application center functionality because it does not need to communicate over long distances. In consideration of this advantage, it will be understood that the CHIMPS 110 can include multiple kernel centers with one or more application centers incorporated therein. Additionally or alternatively, components of the kernel application center may be incorporated into one or more application centers 112 in the CHIMPS 110 to provide quicker access to certain functionality.

Figure 3:
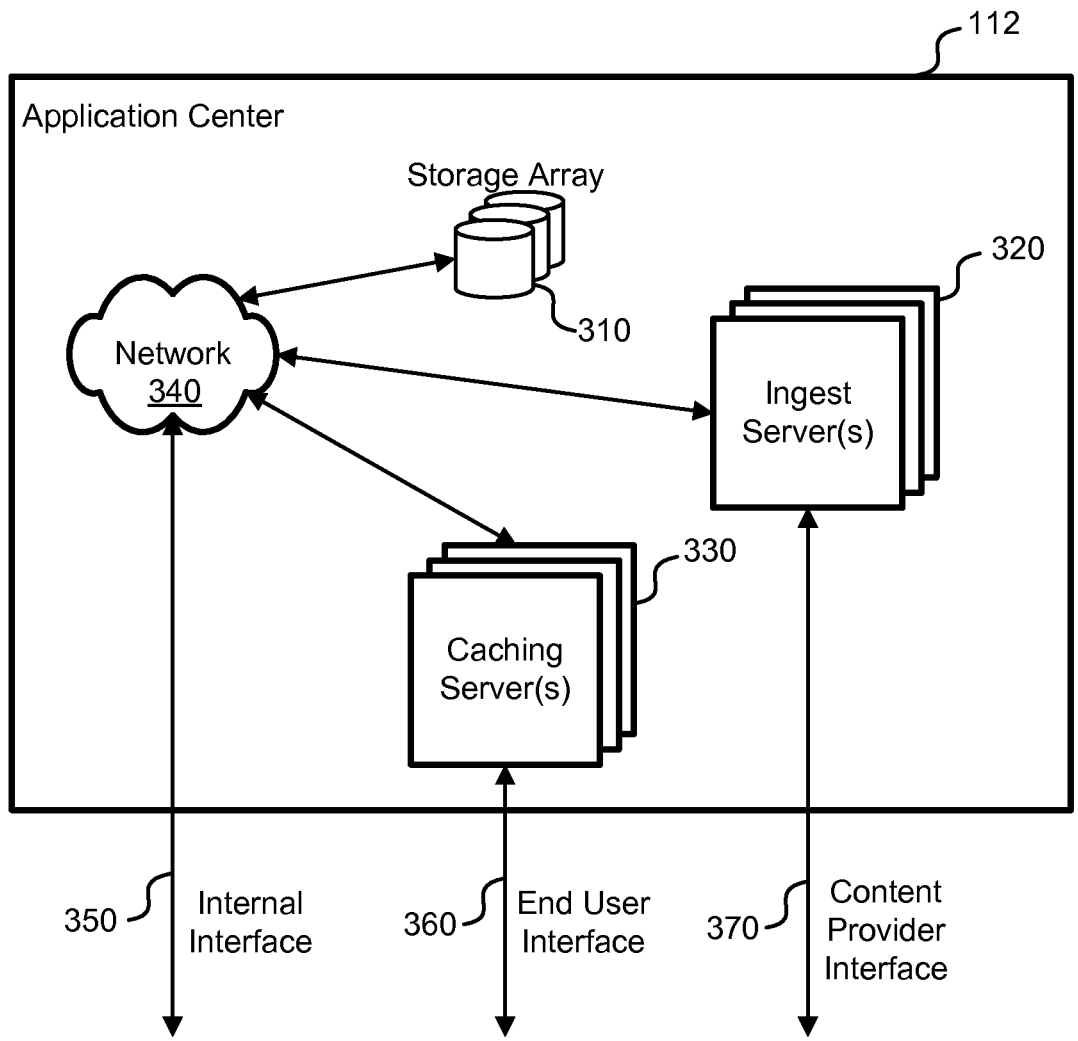
FIG. 3 illustrates a block diagram of an embodiment of an application center.

FIG. 3 is a block diagram illustrating an embodiment of an application center 112. The application center 112 can include caching server(s) 330 and a storage array 310 for storing and distributing data objects of media assets requested by end user devices through end user interface 360. Caching server(s) 330 and storage array 310 can also be used to collect, process, and/or store metrics information from beaconing data, media chunk requests, and/or other data sources, including data collected through end user interface 360. The application center can further include ingest server(s) 320 for ingesting uploaded media assets from a content provider 130 through a content provider interface 370. The media assets may be stored on the storage array 310. As with the kernel application center 111, the components of the application center 112 can be communicatively linked through a network 340, such as a LAN. The application center can further include an internal interface 350, providing a communication link from the application center to the rest of the CHIMPS. It is through internal interface 350, for example, that media assets stored on storage array 310 can be made available to a kernel application center 111 for services such as transcoding.

Figure 4:
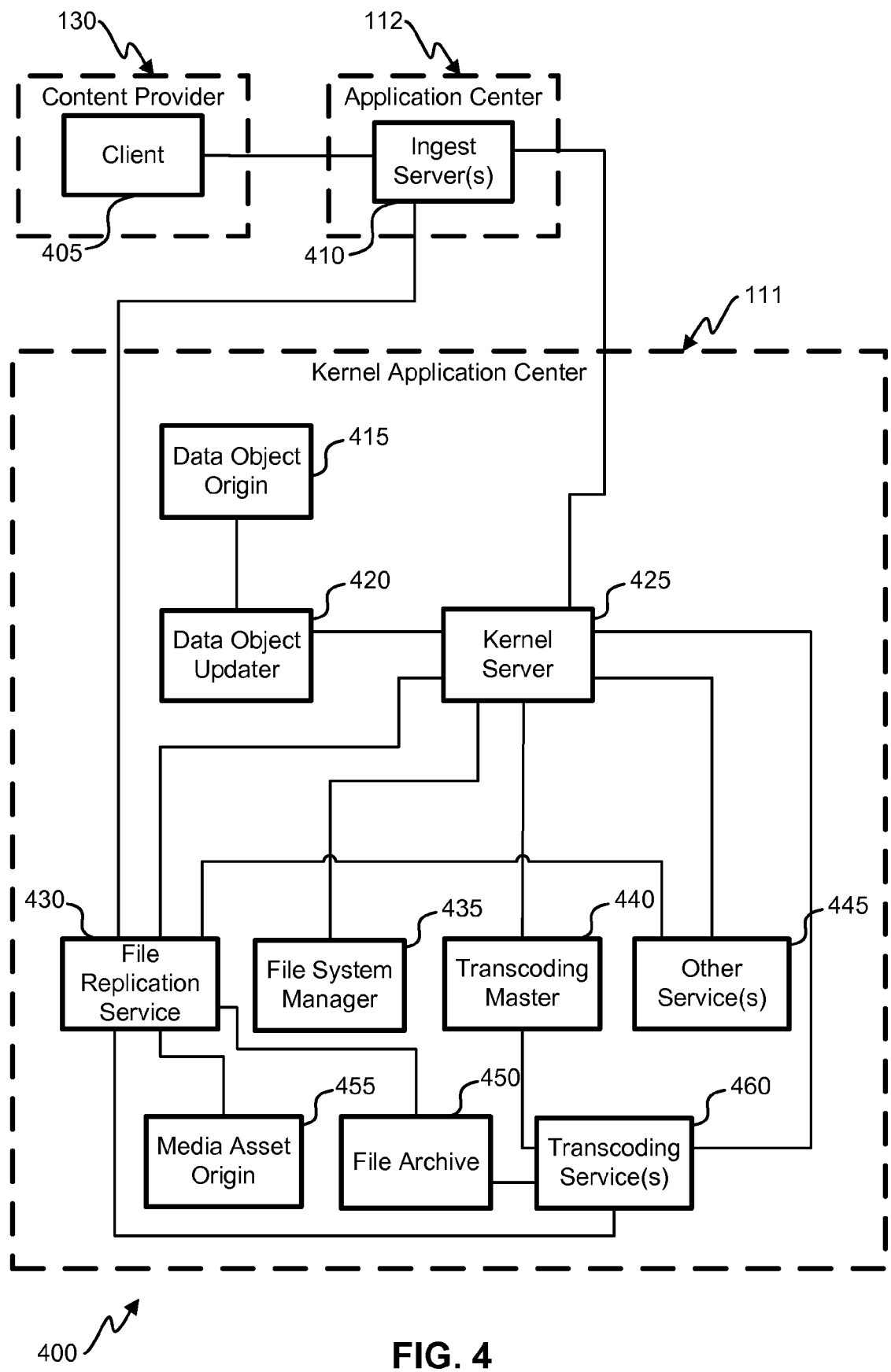
FIG. 4 illustrates a block diagram of processes and objects utilized by a cloud-hosted integrated multi-node pipelining system for media ingestion.

FIG. 4 is a block diagram 400 of processes and objects utilized by the CHIMPS 110 for media ingestion, according to some embodiments. Although FIG. 4 further indicates the physical systems in which my execute or store these processes and objects, it will be understood that the processes and objects disclosed may be executed or stored on more than one system, including systems not disclosed in FIG. 4. In other words, the processes and objects shown in FIG. 4 allow for a variety of implementations through one or more of hardware, software, firmware, microcode, etc.

Media can be ingested into the CHIMPS 110 when a content provider 130 uploads a media asset to ingestion server(s) 410 in an application center 112 by utilizing a client 405. The client 405 can be a stand-alone application or browser based, for example, and can communicate with ingest server(s) 410 through an application programming interface (API) configured for the ingestion of media assets.

Ingest server(s) 410 can communicate with devices in the kernel application center 111 executing programs such as kernel server 425 and file replication service 430. The kernel server 425 can be configured organize the workflow among services such as transcoding 440 file system manager 435, and other services 445 (e.g., analytics, dynamic API, etc.) Upon a particular event, for example, the kernel server can be configured to notify the relevant services of the event, causing the services to process tasks associated with the event.

The file replication service 430, under direction of the kernel server 425, can coordinate the movement of the media assets between services. For example, retrieving the uploaded media asset from the ingest server(s) 410 and storing it on the file archive 450, or retrieving transcoded media assets from transcoding server(s) 460 and storing them in the media asset origin.

The data object updater 420 keeps the data object origin 415 up to date in response to any changes in the system. When, for example, a file is uploaded, transcoded, and stored in media asset origin 455, the location and other metadata concerning the transcoded media assets need to be created or updated in the data object origin 415 to ensure an end user device that accesses the object in the data object origin 415 has the correct information regarding the related media asset. Because the data object updater 420 receives updates from the kernel server 425 (which is notified when a transcoded media asset is stored in the media asset origin 455, the system ensures the data objects in the data object origin are constantly up to date.

The upload of a media asset to the ingest server(s) 410, as described above, can provide an example of how the kernel server 425 may coordinate workflow. For instance, in response to the upload, the ingest server(s) 410 can notify the kernel server 425 that a media asset has been uploaded. The kernel server 425 informs the file replication service 430 of the uploaded media asset, and the file replication service 430 moves the uploaded media asset into the file archive 450 and notifies the kernel server 425 of the move. In response, the kernel server 425 notifies the file replication service 430, the file system manager 435, and the transcoding master 440 of the move. The file replication service 430 then will know it can delete the uploaded media asset from the ingest server(s) 410, the file system manager 435 will update the file system accordingly, and the transcoding master 440 will notify transcoding service(s) 460 of different transcoding tasks to be performed. The transcoding service(s) 460 can then retrieve the uploaded media asset from the file archive 450 to create transcoded media assets. The transcoding service(s) 460 notify the kernel server 425 once transcoding is complete, and the kernel server 425 relays this information to the file replication service 430. The file replication service 425 then takes the transcoded media assets from the transcoding services 460 and moves them to the media asset origin 455. Once the file replication service 430 notifies the kernel server 425 of the move, the kernel server 425, in turn, notifies the file replication service 430 and the data object updater 420. The data object updater 420 which updates the data object origin 415 accordingly, and the file replication service 430 deletes the transcoded media assets from the transcoding services 460.

The modular nature of the system enables all tasks associated with an event to be completed quickly. As illustrated in the example above, workflow relating to a particular event, such as a media asset upload, can be spread among the various services simultaneously. Moreover, because the system's modularity enables it to be scaled to accommodate differing hardware capacities, and because the system can be configured to dynamically allocate hardware to different services according to the needs of the system, the speed of completing tasks relating to a particular event can further be increased. For example, a server of the CHIMPS 110 can be configured to dynamically switch its purpose based on external conditions such as load and overall system performance, providing functions such as transcode, upload, metrics collection, application web service, and more, on an as-needed basis.

Figure 5A:
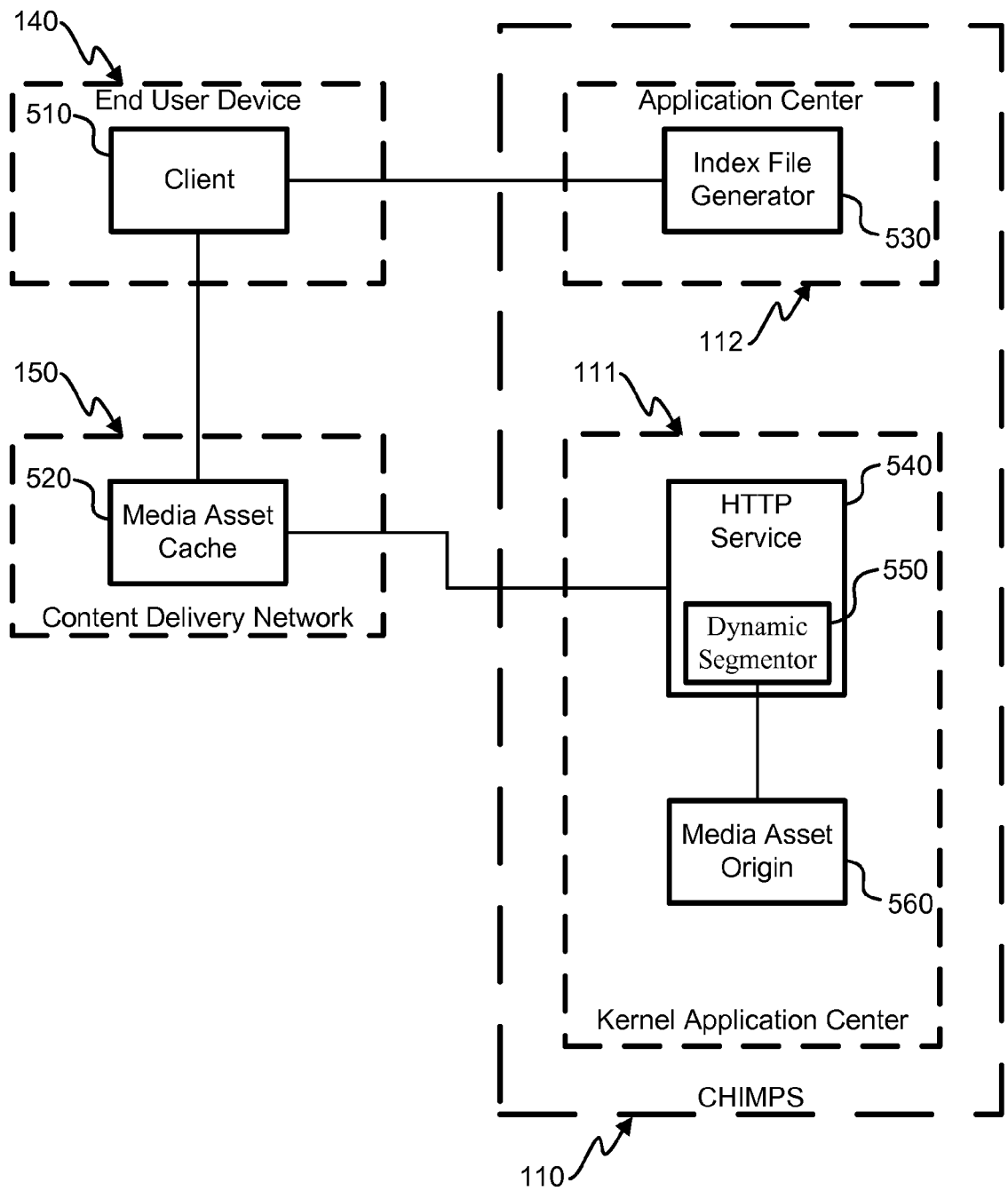
FIG. 5A illustrates a simplified block diagram of an embodiment of a system configured to provide dynamic indexing and chunking for media streaming.

Embodiments of such systems may include other systems that manage various requests from end users. For example, a system for dynamic index file generation and media file chunking Referring to FIG. 5A, shows an embodiment of such a system 500-1. Media may be streamed to end user device 140 though a client 510. As mentioned above, the client 510 can be stand-alone media player, a plug-in, a browser, or other application, which can be executed on a personal computer or other electronic device.

An index file generator 530, as discussed previously, can be a program instantiated for media streaming to a particular client 510. The index file generator 530 can be executed on a server or other computing device within an application center 112 of the CHIMPS 110. Index files generated by the index file generator can include a wide variety of information such as starting, ending, and or run times for media chunks and locations for media chunks. This information can be embedded in a single string of data, such as a URI or a URL. If media includes various sub-streams (e.g., streams with alternative bitrates, captions, alternative languages, etc.) the index file can include data for chunks corresponding to each of the alternative sub-streams, as well as information regarding the bitrate and/or other unique information for each stream. Alternatively or in addition, index files indicating alternative sub-streams may be separate from index files indicating one or more media chunks for streaming.

It should be understood that the index file can further comprise a wide variety of formats, which can depend on the particular protocol. HTTP streaming may, for example, require index files to comprise one or more of M3U, M3U8, XML, and XML-based formats. Of course, other formats can be used in accordance with relevant streaming protocols.

Table 1 illustrates a simplified example of a generated index file in M3U9 format, indicating chunk of media for streaming. The index file in this example provides a URI for a chunk of media. The URI indicates the chunk is to be generated by dynamic segmentor 550, the chunk being 10 seconds long, starting at 9 seconds into the media file and ending 19 seconds into the media file.

TABLE 1

Example Index File Contents

EXTM3U
EXT-X-MEDIA-SEQUENCE:1
EXT-X-TARGETDURATION:10

TABLE 1-continued

Example Index File Contents

EXTINF:10,
http://video.example.com/seg/9/19/seg1.ts

Referring again to FIG. 5A, the index file generator 530 can also include an indicator within an index file to indicate whether a chunk of media is to be dynamically created. If, for example, it is determined that a requested media asset has not been chunked and that the asset will be chunked dynamically, the index file generator can include the indicator in data corresponding to a chunk of media to be created. The indicator, which can be as simple as including the term "/seg/" in a URL, will indicate that a requested chunk of media needs to be generated.

The chunks of media can be generated during media streaming by a dynamic segmentor 550, which can be incorporated into an HTTP service 540. The HTTP service 540, as well as the media asset origin 560 can be located within a kernel application center 111 of the CHIMPS 110 on, for example, a media asset origin server. The system 500-1 can be configured such that the kernel application center 111 provides dynamically-created chunks of media to a CDN 150 for delivery to client 510. The CDN 150 can store the chunks locally in, for example, a media asset cache 520, thereby forgoing the need to dynamically create a chunk again if the same chunk is requested in the future.

In sum, the system for dynamic index file generation and media asset chunking 500-1 can, after receiving a request for an index file from a client 510, dynamically generate an index file with an index file generator 530. The index file can, among other things, indicate where a next chunk of media may be located. A client can then request the chunk from the location indicated by the index file, which can comprise a media asset cache 520 in a CDN 150. If the chunk is not found in the media asset cache 520, the cache miss can redirect the request to a segmentor 550 of an HTTP service 540, which can dynamically generate the requested chunk of media by accessing the corresponding media asset in the media asset origin 560. The requested media chunk can then be provided to the CDN 150 for storage in the media asset cache 520 and delivery to the client 510. If the same chunk is requested at a later point in time, the CDN 150 can deliver the chunk from the media asset cache 520, thereby forgoing the need to redirect the request to the segmentor 550 to regenerate the chunk.

Figure 5B:
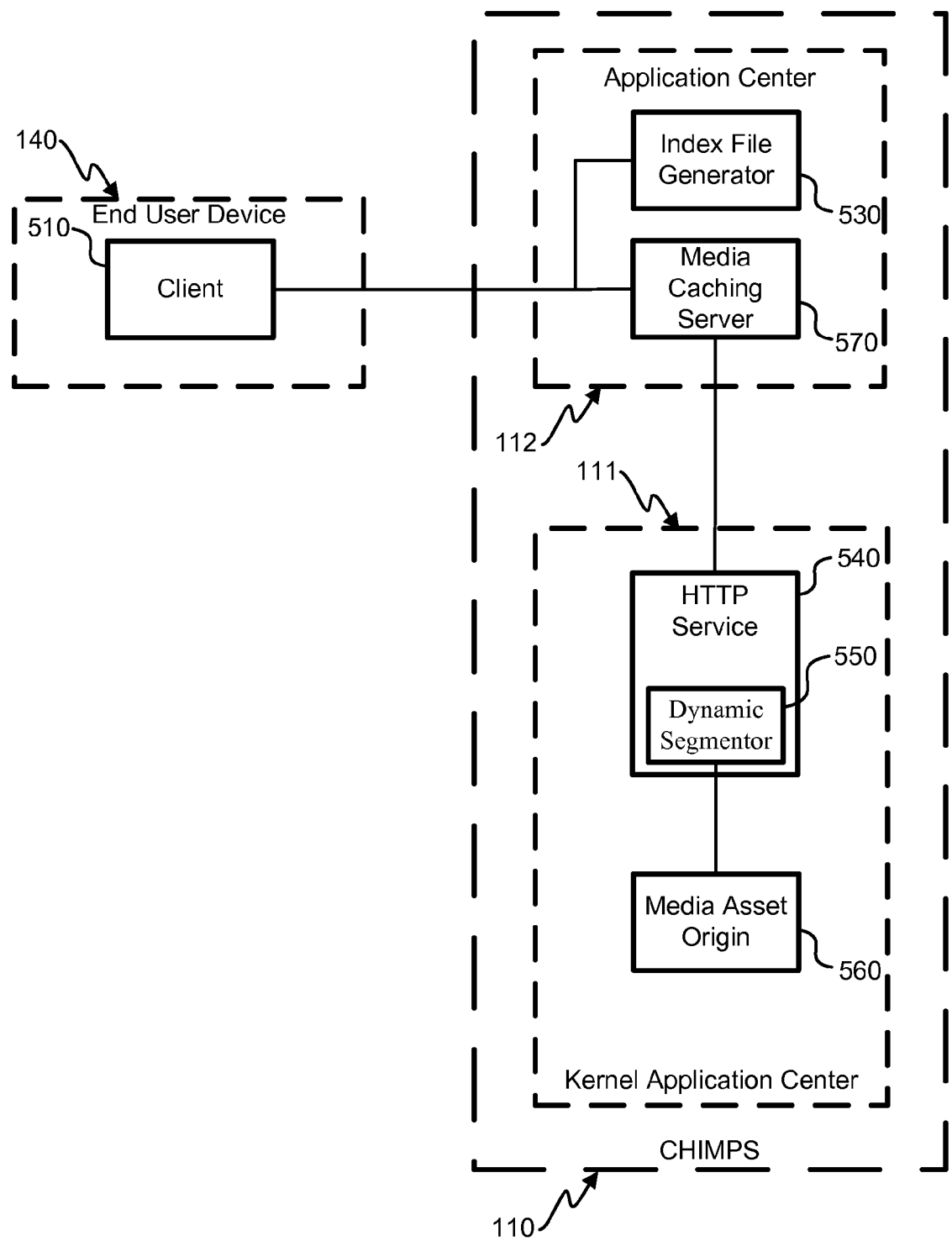
FIG. 5B illustrates a simplified block diagram of another embodiment of a system configured to provide dynamic indexing and chunking for media streaming.

FIG. 5B illustrates an alternative embodiment 500-2 of a system for dynamic index file generation and media file chunking. Rather than utilize a CDN, this embodiment 500-2 includes a media caching server within an application center 112 of the CHIMPS 110. The media caching server can receive chunk requests from and provide the corresponding chunks to a client. It will be understood that such a media caching server(s) or similar device(s) can be located anywhere within the CHIMPS and/or in a system(s) communicatively linked to the CHIMPS.

Figure 5C:
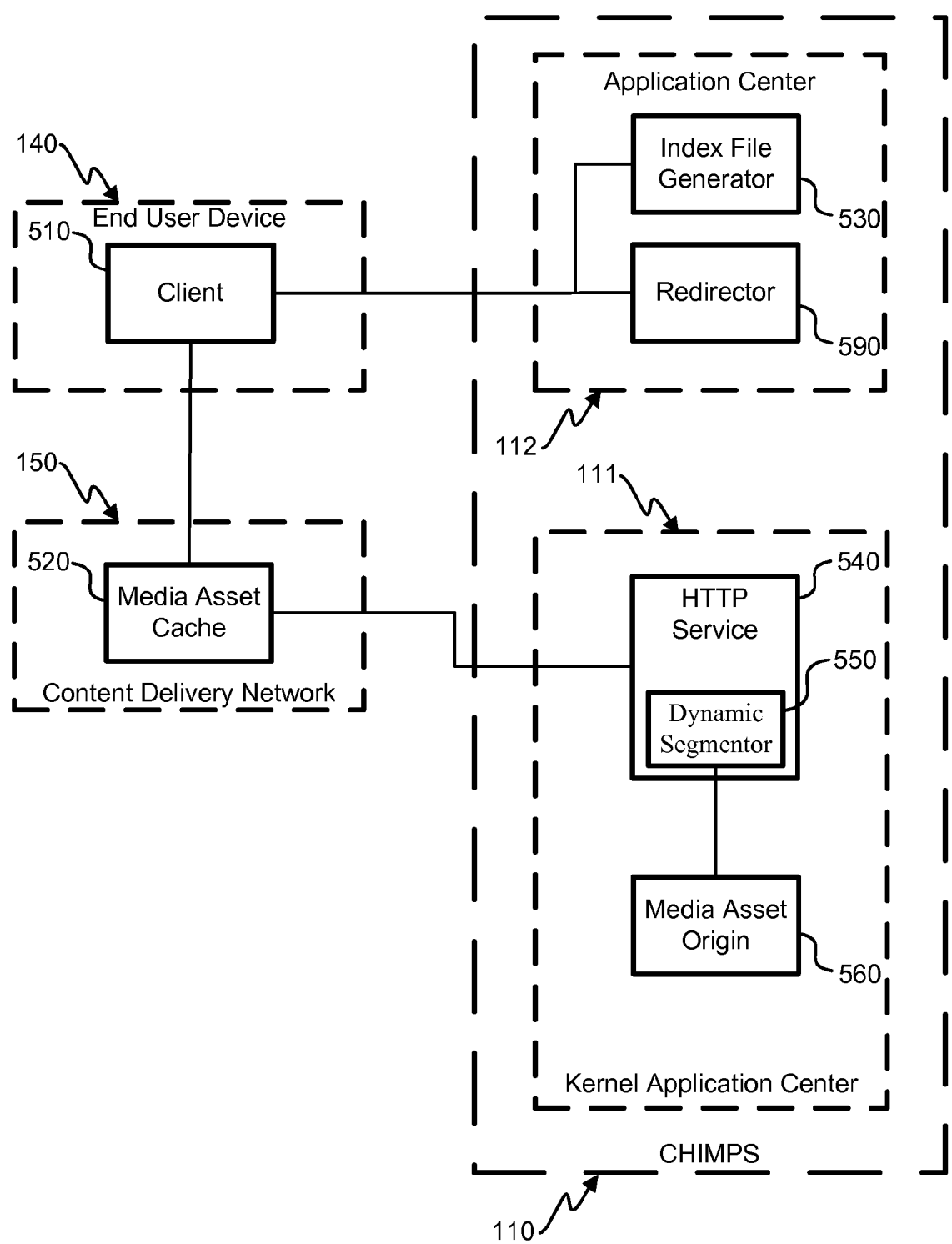
FIG. 5C illustrates a simplified block diagram of another embodiment of a system configured to provide dynamic indexing and chunking for media streaming, utilizing a redirector.

FIG. 5C illustrates an embodiment 500-3 of a system for index file generation used in conjunction with a redirector 590. As discussed above, an index file generator 530 may create an index file having one or more URIs or other location information directing the client 510 to one or more redirectors 590. Redirector 590, can then provide the URI of the requested chunk with a redirect, such as a redirect under HTTP status code 302. The URI can be located on a CDN 520 or other location (such as a media caching server 570) and/or dynamically created by the dynamic segmentor 550. It will be understood that there can be any number of redirectors 590, which can be at any location, including locations of the CHIMPS 110 such as the application center 112 (as shown in FIG. 5C) or the kernel application center 111. It also will be understood that the URI or other location information provided by redirector 590 can be generated by or provided to the redirector 590 in any number of ways. The URI can be generated, for example, based on the request received by redirector 590 from client 510. Finally, it will be understood that the CHIMPS 110 can be configured to dynamically implement any combination of embodiments 500-1, 500-2, and 500-3, further choosing whether to utilize one or more redirectors based on factors such as, for example, a detected type of client 510.

Embodiments utilizing one or more redirectors can have several advantages. For example, and not by way of limitation, if a certain client were implemented in such a way that it "reads ahead" to request chunks, it could result in incorrect reporting data. Thus, it would be advantageous to determine which chunk is actually requested by the client. Additionally or alternatively, where chunks are available in various substreams with different bitrates, determining the actual requested chunk can be useful in calculating Quality of Service (QOS) metrics. Furthermore, if there may be scenarios in which it is more efficient to create larger index files having many chunks comprising large segments of media, reducing the number of index files required to stream a media asset, and thereby reducing the processing requirements to create the index files. If encryption is used having, for example, a rotating key or a per client key encryption scheme in which a valid key might change during playback of a media asset, it also may be advantageous to incorporate redirector(s) for handling legacy keys for some period of time.

Figure 6:
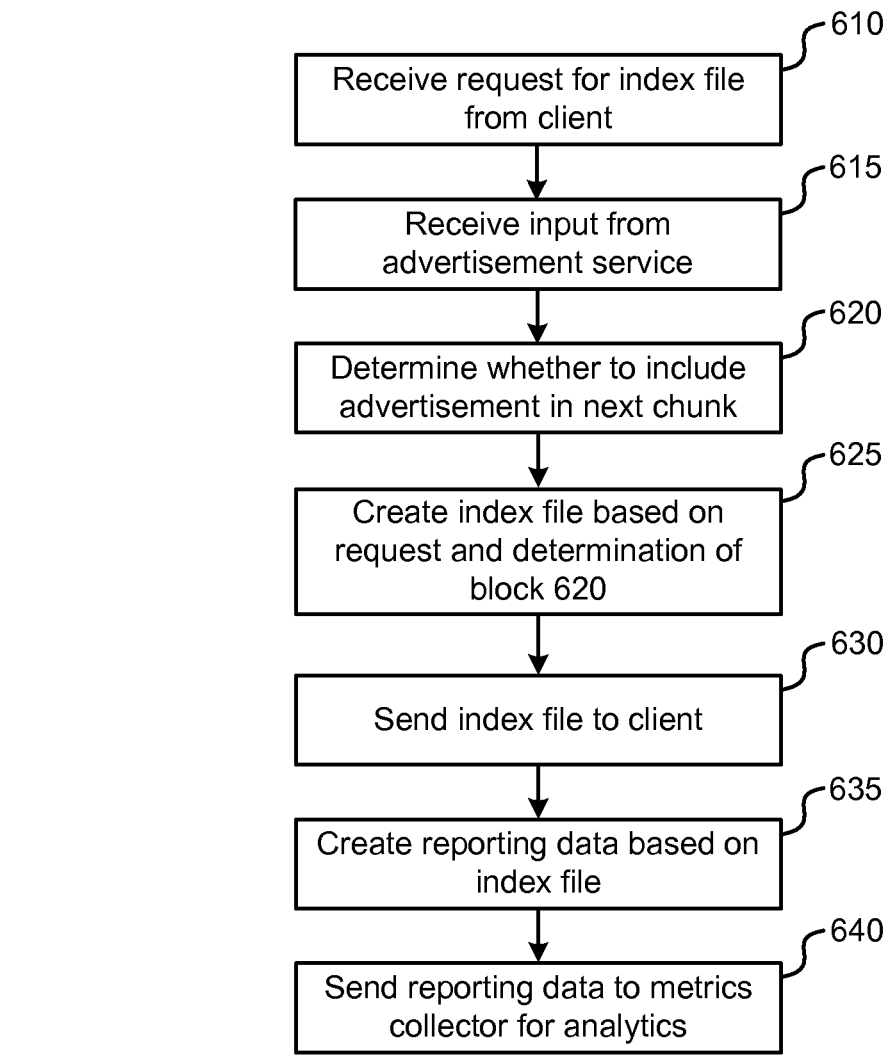
FIG. 6 illustrates a simplified flowchart of an embodiment of a method for implementing a dynamic index for media streaming.

FIG. 6 illustrates a simplified flowchart of an embodiment of a method 600 for implementing a dynamic index for media streaming. The method 600, which can be executed by the index file generator 530, begins at block 610, where a request for an index file is received from a client 510. According to media streaming protocols contemplated by this embodiment, if data regarding a chunk of media is not provided in an initial index file, the client will continue to request or refresh an index file until it reaches an indicator in the index file that signals the end of a stream. Thus, the method can be assured to receive more than one request for an index file from a client provided that an initial index file does not include an indicator signaling the end of the stream.

At block 615, the method 600 additionally provides for receiving input from an advertising service. According to some embodiments, this input could be the availability of an advertisement, and can be provided by a service inside or outside the CHIMPS. In other embodiments, the input could come from a service that factors in any of a variety of factors to indicate that a specific advertisement or type of advertisement should be shown. Or that any advertisement should be shown.

At block 620, a determination is made whether to include an advertisement in the next chunk. According to some embodiments, this determination can be made with or without input from an advertisement service. It should be known that this determination can include the factors used by an advertisement service to provide the input of block 615. Whether the determination includes input from an advertisement service of block 615 or not, the determination can still include factors such as information about an end user collected before or during streaming of the media. This can include behavior of the end user during streaming of the media (as determined, for example, by machine-based logic through beaconing data and/or requested chunks of media provided by a client 510). Factors can also include information regarding the media asset used for streaming (such as type of content or preferred points within the media for an advertisement), preference(s) and/or selection(s) of an end user, when a previous advertisement was shown, time of day, and more. It can further include information regarding the source of a media asset, such as who created and/or provided the asset for viewing by an end user. It will be understood that other embodiments contemplate include secondary media, other than advertisements into the media stream in this manner. Moreover, the secondary media and/or advertisement can be of any length and also may be chunked. Thus, it may be determined that the next chunk includes all, or a select portion, of an advertisement of any specific length.

An index file is created based on the request as well as the determination of whether media, such as an advertisement, should be streamed, indicated by block 625. As discussed above, the index file can assume a variety of formats and include any amount of information regarding a next chunk of media for streaming. For example, HTTP streaming can utilize index files having the URLs of available chunks of media. Information can be embedded in these URLs to indicate a location to download the corresponding chunk of media, starting point and/or ending point of a chunk of media, an indicator to indicate whether the chunk is to be dynamically created by a segmentor 550, a location of an advertisement to be streamed, and more. This information is included in the index file and sent to the client at block 630.

At block 635, reporting data can be created based on information included in the index file. As previously discussed, information included in an index file and/or index file request can indicate the behavior of an end user device 140 during streaming, such as a pause, stop, skip, play, etc. of the media. According to some embodiments, this information can be extracted from requests for an index file and/or providing the requested index file. The information can be gathered in addition to or as a substitute for beaconing data provided by a client 510. Moreover, if beaconing data is provided, the creation of reporting data may be omitted altogether.

Reporting data can include any amount of information regarding end user behavior, as indicated through index file requests and/or provided index files. This can include a particular action and when it was performed. Additionally or alternatively, the data may be kept in a more rudimentary form, depending on the application or embodiment, indicating the data included in a index file request and/or an index file. This reporting data may be stored in a log file for reporting after streaming and/or transmitted during streaming to a relevant service that collects such metrics.

As indicated by block 640, the reporting data may be sent to a metrics collector for analytics. A metrics collector, according to certain embodiments, may be an application executed by a server from within the application center 112 in which the index file generator 530 is executed, or it may be executed elsewhere, such as in a kernel application center 111 or in a system outside the CHIMPS 110. Depending on the form of the reporting data, the metrics collector can further process and store the information.

Figure 7:
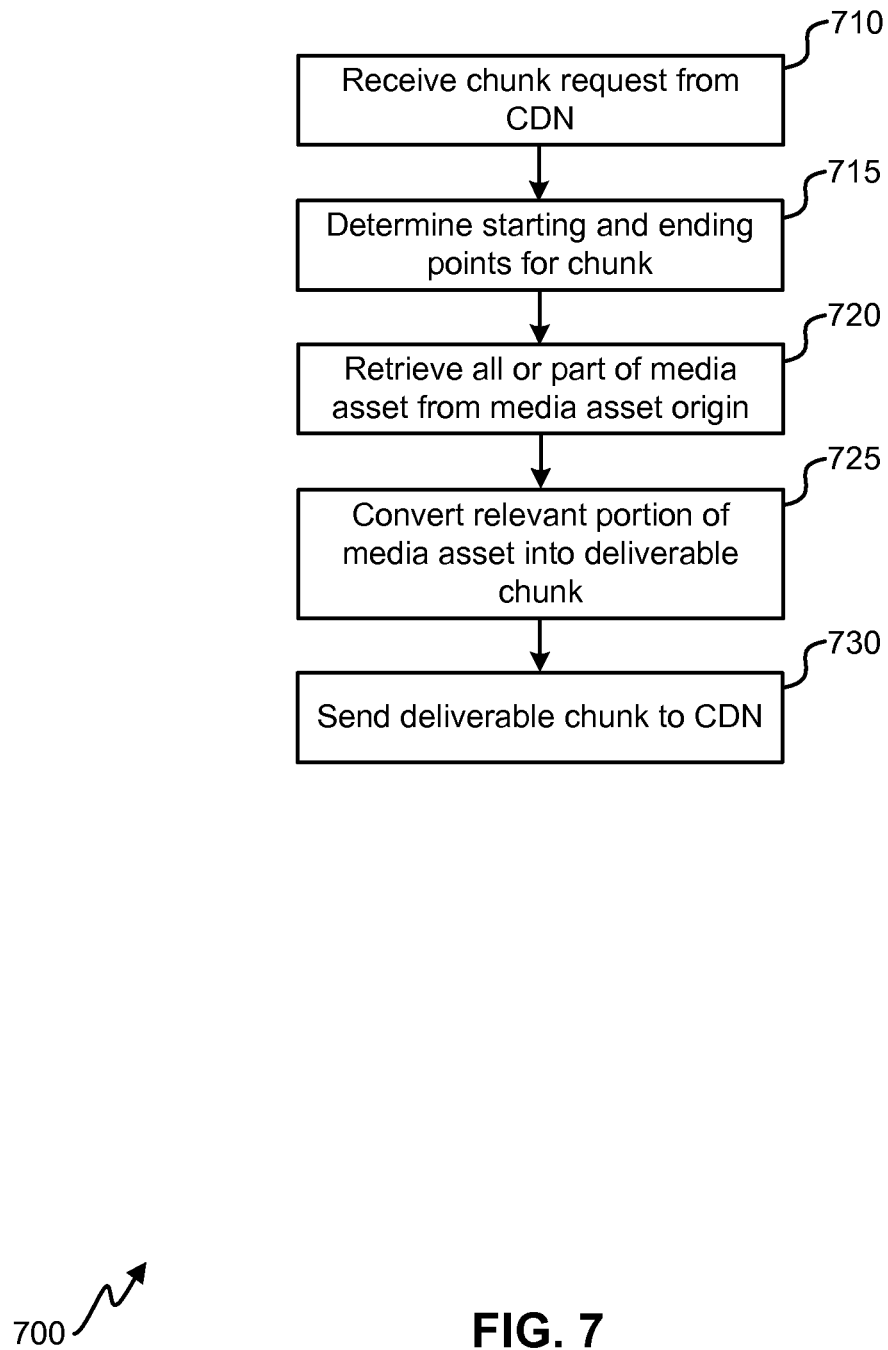
FIG. 7 illustrates a simplified flowchart of an embodiment of a method for dynamically chunking a media file for streaming.

FIG. 7 illustrates a simplified flowchart of an embodiment of a method for dynamically chunking a media file for streaming 700. This method can be employed by a variety of systems and/or programs. For example, it may be executed by a dynamic segmentor 550 of an HTTP service 540 running on a server located in a kernel application center 111 of the CHIMPS 110.

The method 700 can begin at block 710, when a request for a chunk of media is received from a CDN 150. As discussed above, this request may be made in response to a cache miss at the CDN 150 and/or because an indicator was included in the request for the chunk of media that the chunk was to be created dynamically. As discussed herein, if the CDN 150 has the requested chunk cached from a prior request, the CDN 150 can provide the requested chunk and preclude the need to send the request to a dynamic segmentor 550 to generate the chunk. It should be understood that the request may come from sources other than a CDN 150 according to alternative embodiments. One such source includes the media caching server 570 of embodiment 500-2, as shown in FIG. 5B.

The starting and ending points of a requested chunk of media are then determined at block 715. This information can be included directly in the request or derived from the request, a previous request, and/or other sources. At block 720, the information, as well as information identifying the requested chunk of media, can be used to retrieve all or part of the relevant media asset from a media asset origin 560. The retrieved portion will include at least the relevant media from the starting point to the ending point of the requested chunk of media.

At block 725, the requested media chunk is generated by converting the relevant portion of the media asset into a deliverable chunk. The media asset, as stored in the media asset origin, may not be chunked; it may be stored in its entirety as a media file (or group of alternative files corresponding to alternative sub-streams). Generating the chunk therefore can require determining the starting and ending points from the retrieved portion of the media asset and converting the resulting segment of media into a deliverable chunk.

Although the generation of the deliverable chunk may involve transcoding, it may not. The media asset can be stored in a format where transcoding may not be needed, thereby reducing the processing requirements for creating chunks of media during streaming. For example, media assets may be stored such as H.264 or MPEG-4 video format and/or AAC, HE-AAC, or MP3 audio format. According to some streaming protocols, such as some forms of HTTP streaming, chunks of media in these formats would not need transcoding before being wrapped in an MPEG-2 transport stream container format. Instead, such a conversion essentially would require the addition of metadata to create the streaming format from the format of the stored media asset. In other words, generating a deliverable chunk of media may only require identifying the stored media asset, extracting the relevant segment of the media from the media asset, and adding certain metadata in accordance with a container format. This process requires little processing power and can be easily performed on the fly during streaming. Once the deliverable chunk of media is generated, it is sent to the CDN 150 or other requesting entity, at block 730.

Figure 8:
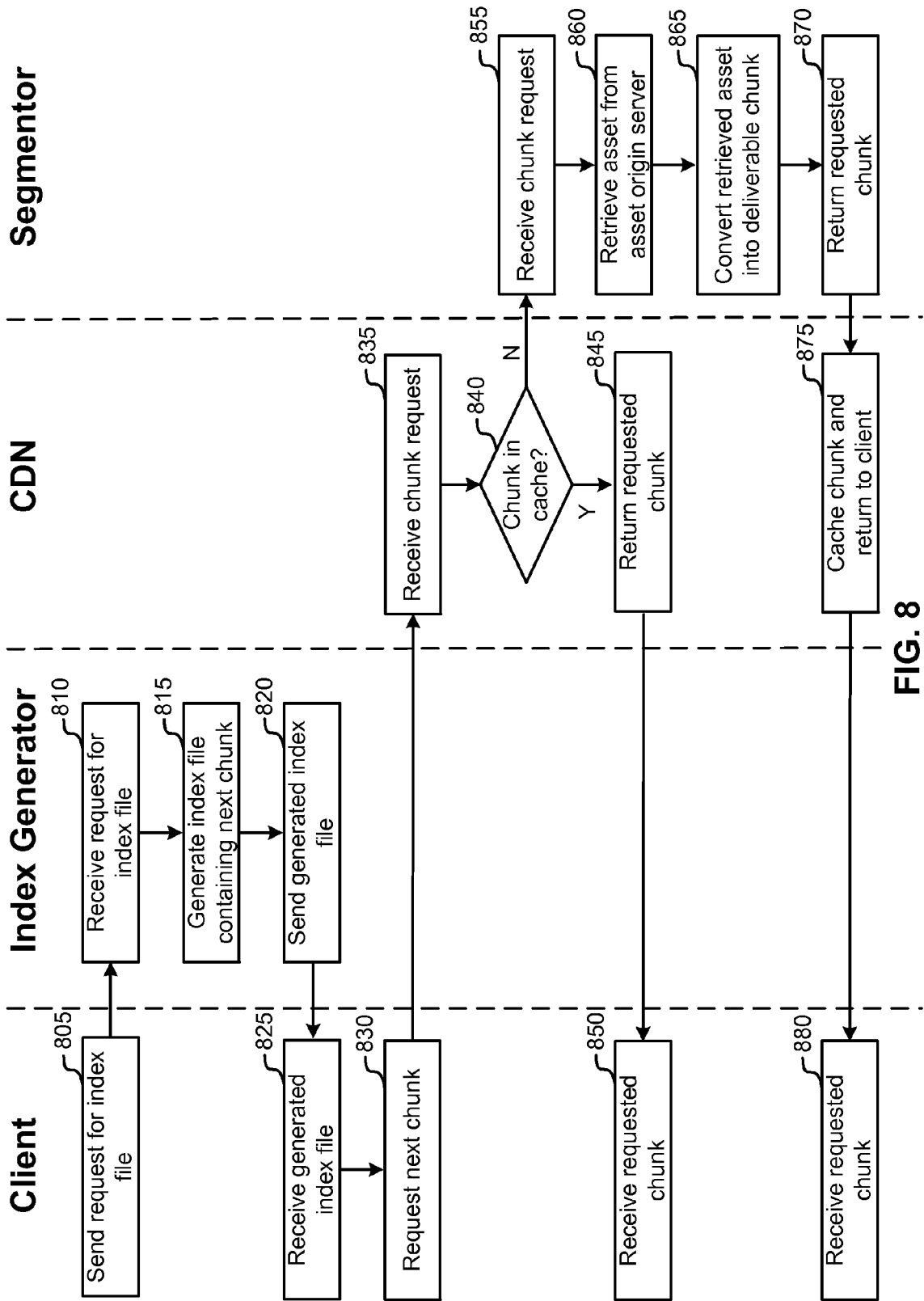
FIG. 8 illustrates a simplified swim lane flowchart describing the interaction of components in a system configured to provide dynamic indexing and chunking for media streaming, according to one embodiment.

FIG. 8 illustrates a simplified swim lane flowchart describing the interaction of components in a system configured to provide dynamic indexing and chunking for media streaming, according to one embodiment. In this embodiment, a client can send a request for an index file 805, the request received by an index file generator 810. A particular request may be made to initiate the streaming of a media asset, or it may be during streaming. Depending on the streaming protocol, the request may be made while a client plays a chunk of media previously downloaded during streaming.

The index file generator generates an index file to indicate the next chunk of media 815. As described above, this chunk may include an advertisement, and the index file can include any amount of information about a chunk of media, including information regarding alternative sub-streams for streaming. The dynamic index file generator can include information regarding existing chunks of media, and, when used in conjunction with a dynamic segmentor may also include information regarding chunks of media that may need to be created. As detailed above, if a chunk of media is to be generated dynamically, the index file generator may indicate this by including an indicator in the generated index file, such as in a URL for one or more chunks described within the index file. Once the index file is generated, the index file generator sends the index file 820, which is received by the client 825.

Alternative embodiments may provide for the generation of index files containing more than a next chunk of media. For example, an index file generator may generate an index file containing information regarding several chunks of media, in which case the chunks of media can be dynamically generated by a dynamic segmentor when requested by the client. The determination of whether to include information regarding more than a next chunk of media can include factors such as whether the index generator is generating reporting data, the desired frequency of such reporting data, and more.

Using information contained in the index file, the client can then request the next chunk of media 830, and this request can be received by a CDN 835. The CDN then checks to see if the chunk is already stored in the cache 840. If so, the CDN can provide the requested chunk to the client, blocks 845 and 850. The requested chunk may be found in a CDN's cache if the chunk was created and stored in the CDN during preprocessing or if the chunk was dynamically created and stored in the CDN from an earlier request.

If the chunk is not found on the CDN, the chunk can be requested of the dynamic segmentor, which receives the request 855 and retrieves the corresponding media asset from an asset origin server 860. As discussed above, the entirety of the relevant media asset does not need to be retrieved as long as at least the portion containing the relevant segment for the requested chunk is retrieved. It will be understood that alternative embodiments can provide for the media asset being stored in a variety of locations accessible, directly or indirectly, to the dynamic segmentor.

The dynamic segmentor can then generate the requested chunk by converting the retrieved media into a deliverable chunk. That is, the dynamic segmentor converts the retrieved media into an acceptable format for streaming, which can vary depending on the streaming protocol utilized. The dynamic segmentor can then return the requested chunk 870 to the CDN, which can cache the chunk and return it to the client 875. Once the chunk is received by the client 880, the client can play the chunk to an end user.

The ability to dynamically generate chunks can enable the CHIMPS 150 to provide dynamic audio track selection for media streaming. Traditional chunking methods typically require media file chunks to be created and stored beforehand, in which case separate chunks must be created and stored for each audio track (causing storage inefficiencies by storing chunks with each audio track separately) or each chunk must include a plurality of audio tracks (causing bandwidth inefficiencies by transmitting chunks with audio tracks that will not be used). The dynamic segmentor's ability to create chunks of a media file in real time, however, can enable the CHIMPS 150 to avoid these inefficiencies by creating requested chunks on demand, having only the requested audio track.

Figure 9A:
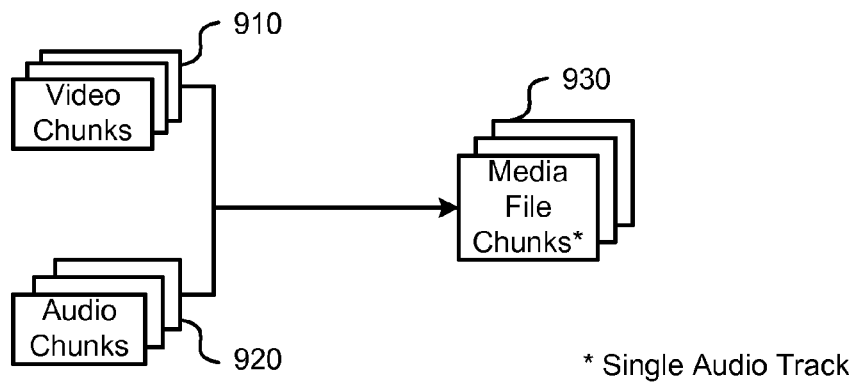
FIGS. 9A-9C are illustrations of embodiments of how media file chunks can be generated to provide for dynamic audio track selection for media streaming.
Figure 9B:
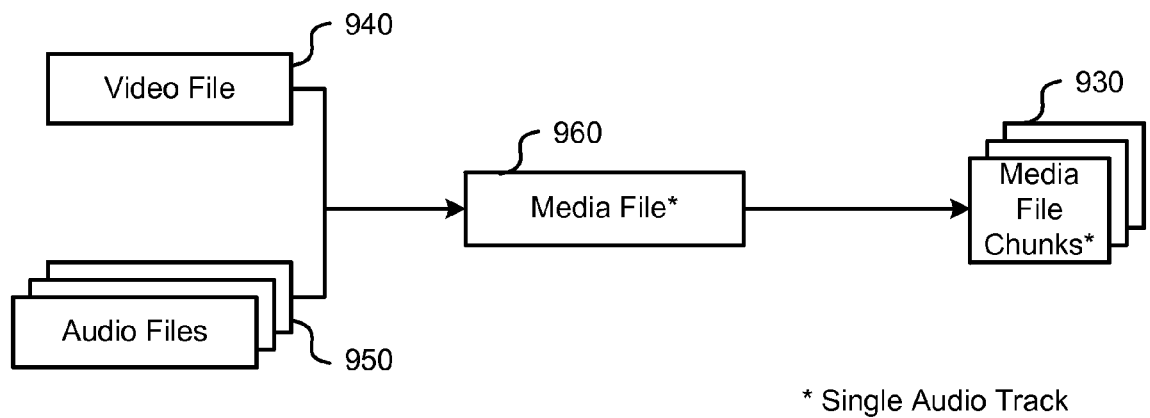
Figure 9C:
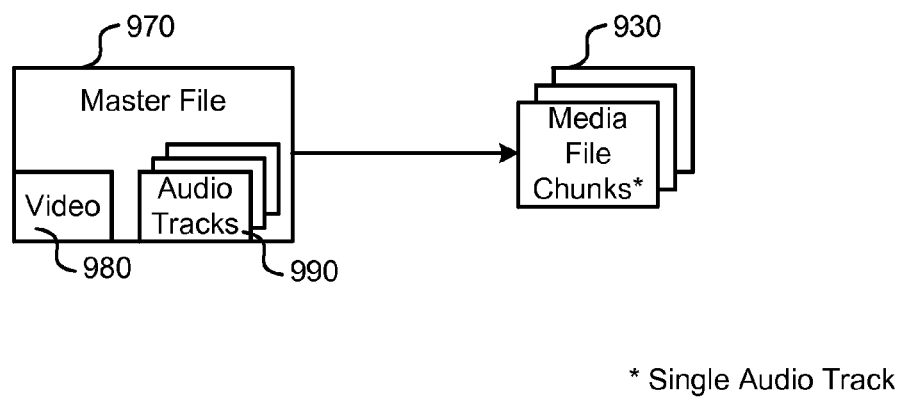

FIGS. 9A-9C illustrate some examples of how audio and video components of a media file can be stored and combined to provide for dynamic audio track selection for media streaming. In the embodiment shown in FIG. 9A, for example, the video and audio components of a media asset are stored in separate video 910 and audio chunks 920. The dynamic segmentor can create media file chunks 930 on demand by selecting, for a requested media asset, the corresponding video 910 and audio 920 chunks, and combining the video and audio into one or more deliverable media file chunks 930 having a the requested audio track.

The URL (or other type of request) received by the dynamic segmentor can include information indicating a requested audio track. According to certain embodiments, this audio track information can be inserted into the URL by the client and/or index file generator. For example, a client media player application may have a user interface that enables a user to select an audio track from a list of available audio tracks. Audio tracks can include different languages, audio channels (e.g., stereo, surround sound, etc.), and/or other options the like. The client can then include, in a URL requesting a chunk for media playback, an indication of the selected audio track. (In alternative embodiments, the media player can indicate the audio track selection in a request for an index file, in which case an index file generator can include an indicator of selected audio track in the URLs included in the index file.) The URL is then provided to the dynamic segmentor, which retrieves the video chunks 910 and the audio chunks 920 corresponding to the selected audio track, and creates media file chunks 930 having the selected audio track. Because the dynamic segmentor can create the media file chunks 930 in real time, this process can accommodate audio track selection changes during playback of the media file. Furthermore, although URLs are used in the examples provided herein, requests of other types can be used additionally or alternatively.

FIG. 9B illustrates another embodiment that includes combining a video file 940 with an audio file (having the selected audio track) into a media file. Although the video chunks 910 and audio chunks 920 of FIG. 9A can be stored in separate files as well, FIG. 9B illustrates how a video file 940 and audio files 950 can be combined in a media file 960, which is then chunked into the media file chunks 930. Thus, the video file 940 and audio files 950 can include larger portions (e.g., all video/audio content) of the requested media file. Although FIGS. 9A and 9B illustrate multiple audio files 950 and audio chunks 920, it will be understood that some embodiments may include a single audio file/chunk having multiple audio tracks, or multiple audio files/chunks having one or more audio tracks.

FIG. 9C illustrates an embodiment utilizing a master file 970. In this embodiment, the master file 970 includes both video 980 and audio components (tracks) 990. In this embodiment, the dynamic segmentor can, after receiving a request for a chunk, retrieve and chunk the master file 970. In instances where the master file has a plurality of audio tracks 990, the dynamic segmentor can combine the requested audio track with the video component 980 while ignoring the other audio tracks. Thus, the resulting media file chunks 930 can contain only the requested audio track.

Figure 10:
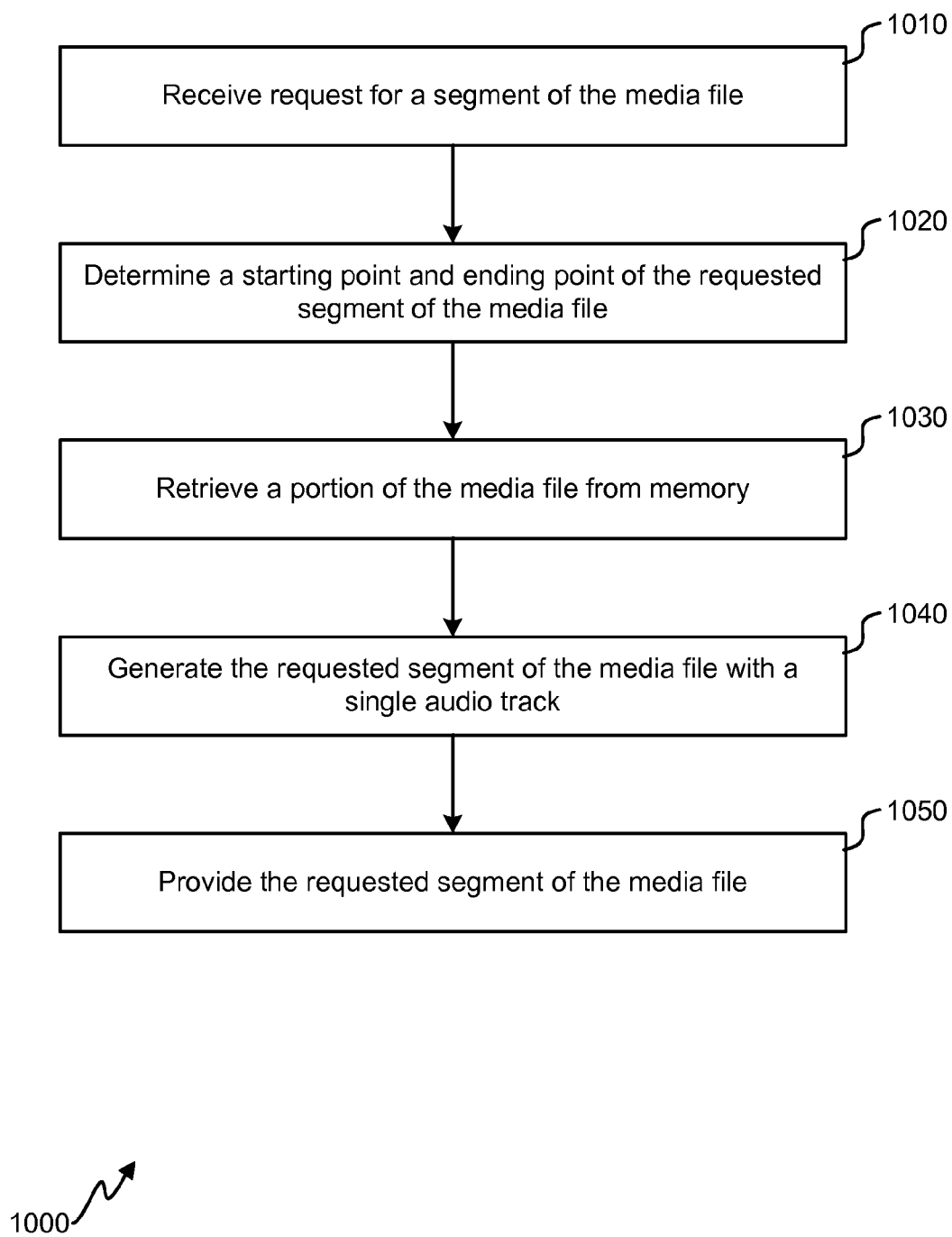
FIG. 10 is a flow diagram illustrating a method for providing dynamic audio track selection for media streaming, according to one embodiment.

FIG. 10 is a flow diagram illustrating a method 1000 for providing dynamic audio track selection for media streaming, according to one embodiment. The some or all of the method 1000 can be performed by any of a variety of systems, such as a dynamic segmentor of the CHIMPS 150 discussed previously, or other computer and/or processing system. Moreover, the method 1000 can be utilized to provide chunks and/or other segments of a media file for media streaming.

At block 1010, a request is received for a segment (e.g., chunk) of the media file. As indicated previously, the request can come from a media player client, CDN, or another requesting entity, in the form of a URL or other resource indicator. The request can include information regarding a requested segment (e.g., start time, end time, audio track, etc.). This enables a starting point and ending point of the requested segment of the media file to be determined, at block 1020.

At block 1030, a portion of the media file is retrieved from memory. This can be done in several ways, as shown in FIGS. 9A-9C. For example, the portion of the media file can include separate video and audio chunks and/or files. For embodiments in which audio tracks are stored in different files, a requested audio track can be identified and only the file with the requested audio track may be retrieved. Alternatively, the portion of the media file can include a master file with both video and audio components. To be clear, the portion of the media file can also include video and/or audio components of all or a large portion of the entire media file, in which case multiple segments can be created from the same media file portion retrieved from memory. Alternatively, as shown in FIG. 9B, the portion of the media file can comprise a media file with a single audio track, which can be generated and stored previously or generated after upon receipt of the request for the media file segment.

At block 1040, the requested segment of the media file with a single audio track is generated. For embodiments in which the portion of the media file retrieved at block 1030 includes more than one audio track, generating the requested segment of the media file may include selecting the requested audio track and/or ignoring other audio tracks. In other embodiments, generating the requested segment of the media file may simply involve chunking a media file or combining audio and video chunks Once the requested segment of the media file is generated, it can be provided at block 1050.

It should be appreciated that the specific method 1000 illustrated in FIG. 10 shows an example of providing dynamic audio track selection for media streaming. Alternative embodiments may include alterations to the embodiments shown. For example, alternative embodiments may include including more than one audio track onto the requested segment of the media file. Furthermore, additional features may be added, removed, or combined depending on the particular applications. One of ordinary skill in the art would recognize many variations, modifications, and alternatives.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A server for communicating a media file via a network, the server comprising: an interface for communicating with the network; a memory configured to store the media file; and a processor communicatively coupled with the memory and the interface, the processor further configured to cause the server to: receive, with the interface, a request for a first segment of the media file, the first segment comprising one of a plurality of separately-addressable segments of the media file; determine, based on the request for the first segment of the media file, a starting point and an ending point of the requested first segment of the media file; retrieve a first portion of the media file from the memory, wherein: the first portion of the media file includes at least the requested first segment of the media file, and the first portion of the media file includes a video component and at least one audio track; generate the requested first segment of the media file, wherein: the requested first segment of the media file has a single audio track, and the requested first segment of the media file is generated, at least in part, from the first portion of the media file without transcoding; and provide, with the interface, the requested first segment of the media file; wherein generating the requested first segment of the media file occurs during playback of the media file.

2. The server recited in claim 1 wherein the processor is configured to cause the server to: receive, with the interface, a request for a second segment of the media file, the second segment comprising one of the plurality of separately-addressable segments of the media file; determine, based on the request for the second segment of the media file, a starting point and an ending point of the requested second segment of the media file; retrieve a second portion of the media file from the memory, wherein the second portion of the media file includes at least the requested second segment of the media file; generate the requested second segment of the media file, wherein the requested second segment of the media file has a single audio track different than the single audio track of the requested first segment of the media file; and provide, with the interface, the requested second segment of the media file.

3. The server recited in claim 2, wherein the first portion of the media file and the second portion of the media file are the same.

4. The server recited in claim 2, wherein the first portion of the media file and the second portion of the media file comprise the entire media file.

5. The server recited in claim 1, wherein the video component and the at least one audio track are stored in separate files.

6. The server recited in claim 1, wherein the video component and the at least one audio track are stored in a single file.

7. The server recited in claim 1, wherein the processor is configured to cause the server to: generate a file comprising the media file with the single audio track; and store the generated file in the memory; wherein the first portion of the media file comprises the generated file.

8. The server recited in claim 7, wherein generating the file comprises combining audio from a first file and video from a second file.

9. The server recited in claim 1, wherein: the at least one audio track comprises two or more audio tracks; and the processor is configured to cause the server to select the single audio track from the two or more audio tracks based on information received in the request for the first segment of the media file.

10. A method for streaming a media file via a data network, the method comprising: receiving a request for a first segment of the media file, the first segment comprising one of a plurality of separately-addressable segments of the media file; determining, based on the request for the first segment of the media file, a starting point and an ending point of the requested first segment of the media file; retrieving a first portion of the media file, wherein: the first portion of the media file includes at least the requested first segment of the media file, and the first portion of the media file includes a video component and at least one audio track; generating, with a processing unit, the requested first segment of the media file, wherein: the requested first segment of the media file has a single audio track, and the requested first segment of the media file is generated, at least in part, from the first portion of the media file without transcoding; and providing the requested first segment of the media file; wherein generating the requested first segment of the media file occurs during playback of the media file.

11. The method recited in claim 10, further comprising:
receiving a request for a second segment of the media file, the second segment comprising one of the plurality of separately-addressable segments of the media file;
determining, based on the request for the second segment of the media file, a starting point and an ending point of the requested second segment of the media file;
retrieving a second portion of the media file, wherein the second portion of the media file includes at least the requested second segment of the media file;
generating, with the processing unit, the requested second segment of the media file, wherein the requested second segment of the media file has a single audio track different than the single audio track of the requested first segment of the media file; and
providing the requested second segment of the media file.

12. The method recited in claim 10, wherein the video component and the at least one audio track are stored in separate files.

13. The method recited in claim 10, further comprising: generating a file comprising the media file with the single audio track; and storing the generated file; wherein the first portion of the media file comprises the generated file.

14. The method recited in claim 13 wherein generating the file comprises combining audio from a first file and video from a second file.

15. The method recited in claim 10 wherein the at least one audio track comprises a plurality of audio tracks, the method further comprising selecting the single audio track from the plurality of audio tracks based on information received in the request for the first segment of the media file.

16. A non-transitory computer-readable storage medium having instructions embedded thereon for streaming a media file via a data network, the instructions including computer code for: receiving a request for a first segment of the media file, the first segment comprising one of a plurality of separately-addressable segments of the media file; determining, based on the request for the first segment of the media file, a starting point and an ending point of the requested first segment of the media file; retrieving a first portion of the media file, wherein: the first portion of the media file includes at least the requested first segment of the media file, and the first portion of the media file includes a video component and at least one audio track; generating the requested first segment of the media file, wherein: the requested first segment of the media file has a single audio track, and the requested first segment of the media file is generated, at least in part, from the first portion of the media file without transcoding; and providing the requested first segment of the media file; wherein generating the requested first segment of the media file occurs during playback of the media file.

17. The non-transitory computer-readable storage medium of claim 16, wherein the instructions include computer code for: receiving a request for a second segment of the media file, the second segment comprising one of the plurality of separately-addressable segments of the media file; determining, based on the request for the second segment of the media file, a starting point and an ending point of the requested second segment of the media file; retrieving a second portion of the media file, wherein the second portion of the media file includes at least the requested second segment of the media file; generating the requested second segment of the media file, wherein the requested second segment of the media file has a single audio track different than the single audio track of the requested first segment of the media file; and providing the requested second segment of the media file.

18. The non-transitory computer-readable storage medium of claim 16, wherein the video component and the at least one audio track are stored in separate files.

19. The non-transitory computer-readable storage medium of claim 16, wherein the instructions include computer code for: generating a file comprising the media file with the single audio track; and storing the generated file; wherein the first portion of the media file comprises the generated file.

20. The non-transitory computer-readable storage medium of claim 19, wherein generating the file comprises combining audio from a first file and video from a second file.

* * * * *